United States Patent
Liu

(10) Patent No.: US 10,911,924 B2
(45) Date of Patent: Feb. 2, 2021

(54) METHOD AND APPARATUS FOR A GENERIC SERVICE INTERFACE FOR A PUBLIC WARNING SYSTEM MANAGEMENT AND NOTIFICATION

(71) Applicant: Nokia Solutions and Networks Oy, Espoo (FI)

(72) Inventor: Jennifer Liu, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/151,599

(22) Filed: Oct. 4, 2018

(65) Prior Publication Data
US 2019/0110182 A1 Apr. 11, 2019

Related U.S. Application Data

(60) Provisional application No. 62/568,877, filed on Oct. 6, 2017.

(51) Int. Cl.
| | |
|---|---|
| H04M 11/04 | (2006.01) |
| H04W 4/90 | (2018.01) |
| H04L 29/08 | (2006.01) |
| H04W 4/06 | (2009.01) |
| H04W 76/50 | (2018.01) |
| H04L 12/18 | (2006.01) |
| H04W 4/12 | (2009.01) |

(Continued)

(52) U.S. Cl.
CPC .............. *H04W 4/90* (2018.02); *H04L 12/189* (2013.01); *H04L 67/28* (2013.01); *H04W 4/06* (2013.01); *H04W 4/12* (2013.01); *H04W 60/00* (2013.01); *H04W 76/50* (2018.02); *H04W 84/042* (2013.01)

(58) Field of Classification Search
CPC . H04W 76/007; H04W 76/002; H04W 76/02; H04W 4/22; H04W 4/02; H04W 64/00; H04W 92/02; H04W 88/02; H04W 88/06
USPC ...................... 455/404.1, 404.2, 456.1, 422.1
See application file for complete search history.

(56) References Cited

U.S. PATENT DOCUMENTS

| | | | | |
|---|---|---|---|---|
| 2013/0337767 | A1* | 12/2013 | Siomina ................ | G01S 5/0009 455/404.2 |
| 2015/0280845 | A1* | 10/2015 | Ballakur ................. | H04W 4/90 455/3.01 |

(Continued)

OTHER PUBLICATIONS

"3rd Generation Partnership Project; Technical Specification Group Core Network and Terminals; Technical realization of Cell Broadcast Service (CBS) (Release 15)", 3GPP TS 23.041, V15.2.0, Jun. 2018, pp. 1-93.

(Continued)

*Primary Examiner* — Temica M Beamer
(74) *Attorney, Agent, or Firm* — Alston & Bird LLP

(57) ABSTRACT

A method, apparatus and computer program product are provided for performing a public warning system (PWS) function. In the context of a method, a warning message is received via a first interface. The warning message is provided by a cell broadcast entity. The method includes transforming the warning message. The method further includes causing the warning message, as transformed, to be transmitted via a second interface, different than the first interface, to an access and mobility management function (AMF) for transmission to a radio access network.

19 Claims, 18 Drawing Sheets

(51) Int. Cl.
*H04W 60/00* (2009.01)
*H04W 84/04* (2009.01)

(56) References Cited

U.S. PATENT DOCUMENTS

| | | | |
|---|---|---|---|
| 2015/0365809 A1* | 12/2015 | Lemberg | H04W 4/90 |
| | | | 455/404.1 |
| 2017/0034681 A1* | 2/2017 | Netto | H04W 4/12 |
| 2017/0201871 A1* | 7/2017 | Ryu | H04W 4/70 |
| 2018/0103400 A1* | 4/2018 | Mochizuki | H04W 36/00835 |
| 2018/0324571 A1* | 11/2018 | Buckley | H04W 4/70 |

OTHER PUBLICATIONS

International Search Report and Written Opinion received for corresponding Patent Cooperation Treaty Application No. PCT/EP2018/076937, dated Jan. 23, 2019, 15 pages "Pseudo-CR on Supporting PWS in 5GS via Service Based Interface", 3GPP TSG-CT WG1 Meeting #105, C1-173503, Agenda item: 15.2.1.7, Nokia, Aug. 21-25, 2017, 6 pages "Stage 3 TPs for Support of PWS in NG-RAN", 3GPP TSG RAN WG3 Meeting #97, R3-173078, Agenda Item: 10.4, Huawei, Aug. 21-25, 2017, pp. 1-14.

"Pseudo-CR on Architectural Option Evaluation for PWS in 5GS", 3GPP TSG-CT WG1 Meeting #105, C1-173075, Agenda item : 15.2.1.7, Aug. 21-25, 2017, 4 pages "Introduction on Support of PWS in 5GS", 3GPP TSG-CT WG1 Meeting #104, C1-172264, Nokia, May 15-19, 2017, 18 pages

* cited by examiner

Table 1: PWSF- AMF interface operations

| Name | Originator | Type | Service operations |
|---|---|---|---|
| PWS service subscribe/unsubscribe | AMF | Request | Npwsf_PWService subscribe |
| AMF N2 Cell Broadcase message notification subscribe | PWSF | Request | Namf_Communication_N2InfoSubscribe Namf_Communication_N2InfoUnsubscribe |
| WRITE_REPLACE_WARNING_REQUEST | PWSF | Request/Indication | Namf_Communication_N1N2Message Transfer |
| WRITE_REPLACE_WARNING_CONFIRM | AMF | Response/Confirm | Namf_Communication_N2InfoNotify |
| STOP_WARNING_REQUEST | PWSF | Request/Indication | Namf_Communication_N1N2MessageTransfer |
| STOP_WARNING_CONFIRM | AMF | Response/Confirm | Namf_Communication_N2InfoNotify |
| WRITE_REPLACE_WARNING_INDICATION | AMF | Request/Indication | Namf_Communication_N2InfoNotify |
| STOP_WARNING_INDICATION | AMF | Request/Indication | Namf_Communication_N2InfoNotify |
| RESTART_INDICATION_NG_RAN | AMF | Request/Indication | Namf_Communication_N2InfoNotify |
| FAILURE_INDICATION_NG_RAN | AMF | Request/Indication | Namf_Communication_N2InfoNotify |

Fig. 6A

Table 2: CBC – PWSF interface primitives

| Name | Originator | Type |
|---|---|---|
| WRITE_REPLACE_WARNING_REQUEST | CBC | Request/Indication |
| WRITE_REPLACE_WARNING_CONFIRM | PWSF | Response/Confirm |
| STOP_WARNING_REQUEST | CBC | Request/Indication |
| STOP_WARNING_CONFIRM | PWSF | Response/Confirm |
| WRITE_REPLACE_WARNING_INDICATION | PWSF | Request/Indication |
| STOP_WARNING_INDICATION | PWSF | Request/Indication |
| RESTART_INDICATION_NG_RAN | PWSF | Request/Indication |
| FAILURE_INDICATION_NG_RAN | PWSF | Request/Indication |

Fig. 6B

Table 3: AMF Services

| Service Name | Service Operations | Known Consumer(s) | Operation Semantic | Note |
|---|---|---|---|---|
| mf_Communication | N2InfoSubscribe | PWSF | Request/Response | N2Infotype=CB |
| | N2InfoUnsubscribe | PWSF | Request/Response | N2Infotype=CB |
| | N2InfoNotify | PWSF | Request/Response | N2Infotype=CB |
| | N1N2MessageTransfer | PWSF | Request/Response | N2Infotype=CB |

Fig. 6C

Table 4: PWSF Services

| Service Name | Service Operations | Known Consumer(s) | Operation Semantic |
|---|---|---|---|
| wsf_PWService | Subscribe | AMF | Request/Response |
| | Unsubscribe | AMF | Request/Response |

Fig. 6D

METHOD AND APPARATUS FOR A GENERIC SERVICE INTERFACE FOR A PUBLIC WARNING SYSTEM MANAGEMENT AND NOTIFICATION

BACKGROUND

A Public Warning System (PWS) is an important feature in modern communications and is a required feature for many mobile user equipment devices according to various governmental regulations. A properly implemented and reliable PWS is essential to enable the public to take appropriate action to protect their families and themselves from serious injury, loss of life and/or damage to property during various public hazards and emergencies, such as earthquakes, tsunamis, hurricanes, wild fires, etc.

BRIEF SUMMARY

As mobile communication technology advances, the requirements and standards adopted by the mobile communications industry are continually updated and changed. The fifth generation (5G) of standards requires a service based architecture where network functions within the 5G control plane are characterized by modularized services that may be re-used by multiple network functions. Additionally, service based interfaces are used for the interactions between the core network control plane functions and for accessing services, such as PWS services, provided by network functions. This modularized approach towards defining a 5G control plane architecture is considered suitable for a virtualized network and offers greater reusability, scalability and interface simplification than a traditional point to point reference model.

A service based PWS function (PWSF) is described herein. This service includes the network PWSF which enables support of PWS services in the 5G core network via service based interfaces. These service based interfaces include Npwsf and Namf service interfaces and operations for PWS feature realization both in legacy implementations and future standard generations.

As also described herein, the PWSF is configured to reuse existing SBc interface/protocols towards legacy cell broadcast center (CBC) network elements and to support PWS message delivery and cancellation via service based 5G core network interfaces.

Furthermore, the PWSF is also configured to enable delivery of next generation radio access network (NG-RAN) failure and restart indications towards the CBC via service based 5G core network interfaces.

Methods, apparatuses, and computer program products are provided in accordance with example embodiments in order to provide a service based public warning system interface.

In one embodiment, a method for providing a warning message via a PWS system is provided. The method comprises: generating a public warning system function start up request and transmitting the request to a network registry, receiving a subscription request from an access and management function (AMF) service comprising a warning area list, subscribing to network notifications from a radio access network via the AMF service, receiving a warning message comprising an active warning area list, transforming the warning message for transmission to a radio access network, and transmitting the transformed warning message to the radio access network via the AMF service.

In one example embodiment, an apparatus for providing a warning message via a PWS system is provided. The apparatus includes at least one processor and at least one memory including computer program code with at least one memory and the computer program code configured to, with the processor, cause the apparatus to at least: generate a public warning system function start up request and transmit the request to a network registry, receive a subscription request from an access and management function (AMF) service comprising a warning area list, subscribe to network notifications from a radio access network via the AMF service, receive a warning message comprising an active warning area list, transform the warning message for transmission to a radio access network, and transmit the transformed warning message to the radio access network via the AMF service.

In a further embodiment, a computer program product is provided that includes at least one non-transitory computer readable storage medium having computer-executable program code portions stored therein with the computer-executable program code portions including program code instructions configured to provide a warning message via a PWS system. The program code portions of an example embodiment also include program code instructions configured to generate a public warning system function start up request and transmit the request to a network registry, receive a subscription request from an access and management function (AMF) service comprising a warning area list, subscribe to network notifications from a radio access network via the AMF service, receive a warning message comprising an active warning area list, transform the warning message for transmission to a radio access network, and transmit the transformed warning message to the radio access network via the AMF service.

In yet another example embodiment, an apparatus is provided that includes means for providing a warning message via a PWS system. The apparatus includes means for generating a public warning system function start up request and transmitting the request to a network registry, receiving a subscription request from an access and management function (AMF) service comprising a warning area list, subscribing to network notifications from a radio access network via the AMF service, receiving a warning message comprising an active warning area list, transforming the warning message for transmission to a radio access network, and transmitting the transformed warning message to the radio access network via the AMF service.

In an example embodiment, an apparatus is provided that is configured to perform a public warning system (PWS) function. The apparatus comprises at least one processor and at least one memory including computer program code for one or more programs with the at least one memory and the computer program code configured to, with the at least one processor, cause the apparatus at least to receive a warning message via a first interface, such as an SBc-like point to point interface. The warning message is provided by a cell broadcast entity. The apparatus is also caused to transform the warning message. The apparatus is further caused to cause the warning message, as transformed, to be transmitted via a second interface, such as a a service based interface different than the first interface, to an access and mobility management function (AMF) for transmission to a radio access network.

The warning message that is received in accordance with an example embodiment identifies a warning area. In this example embodiment, the apparatus is caused to cause the warning message, as transformed, to be transmitted to one or more radio access networks which broadcast over the warning area. In an example embodiment, the apparatus is further caused to receive a cancellation indication from the AMF including a broadcast cancelled area list and to cause information regarding the cancellation indication to be transmitted to the cell broadcast entity. The apparatus of an example embodiment is further caused to receive a warning delivery related notification from the AMF and to cause information regarding the warning delivery related notification to be transmitted to the cell broadcast entity. The warning delivery notification comprises an indication related to a failure or a restart. The warning message is transformed in accordance with an example embodiment by interpreting a warning message request provided by the cell broadcast entity and generating a WRITE-REPLACE-WARNING-REQUEST message to be transmitted to the AMF. In an example embodiment, the apparatus is caused to receive the warning message via the first interface utilizing a protocol stack that supports an application layer protocol for transferring warning messages and a stream control transmission protocol for delivering signaling messages.

In another example embodiment, a method is provided for performing a public warning system (PWS) function. The method comprises receiving a warning message via a first interface, such as an SBc-like point to point interface. The warning message is provided by a cell broadcast entity. The method also comprises transforming the warning message. The method further comprises causing the warning message, as transformed, to be transmitted via a second interface, such as a service based interface different than the first interface, to an access and mobility management function (AMF) for transmission to a radio access network.

The warning message that is received in accordance with an example embodiment identifies a warning area. In this example embodiment, the method causes the warning message, as transformed, to be transmitted to one or more radio access networks which broadcast over the warning area. The method of an example embodiment also includes receiving a cancellation indication from the AMF including a broadcast cancelled area list and causing information regarding the cancellation indication to be transmitted to the cell broadcast entity. In an example embodiment, the method also includes receiving a warning delivery related notification from the AMF and causing information regarding the warning delivery related notification to be transmitted to the cell broadcast entity. The warning delivery notification comprises an indication related to a failure or a restart. The method of an example embodiment transforms the warning message by interpreting a warning message request provided by the cell broadcast entity and generating a WRITE-REPLACE-WARNING-REQUEST message to be transmitted to the AMF. In an example embodiment, the method receives the warning message via the first interface by utilizing a protocol stack that supports an application layer protocol for transferring warning messages and a stream control transmission protocol for delivering signaling messages. The method of an example embodiment further comprises broadcasting information based upon the warning message, as transformed, via the radio access network to one or more user equipment.

In a further example embodiment, a computer program product is provided for performing a public warning system (PWS) function. The computer program product comprises at least one non-transitory computer-readable storage medium having computer executable program code instructions stored therein with the computer executable program code instructions comprising program code instructions configured, upon execution, to receive a warning message via a first interface, such as an SBc-like point to point interface. The warning message is provided by a cell broadcast entity. The computer executable program code instructions also comprise program code instructions configured, upon execution, to transform the warning message and to cause the warning message, as transformed, to be transmitted via a second interface, such as a service based interface different than the first interface, to an access and mobility management function (AMF) for transmission to a radio access network.

The warning message that is received in accordance with an example embodiment identifies a warning area. In this example embodiment, the warning message, as transformed, is transmitted to one or more radio access networks which broadcast over the warning area. The computer executable program code instructions of an example embodiment also include program code instructions configured, upon execution, to receive a cancellation indication from the AMF including a broadcast cancelled area list and to cause information regarding the cancellation indication to be transmitted to the cell broadcast entity. In an example embodiment, the computer executable program code instructions also include program code instructions configured, upon execution, to receive a warning delivery related notification from the AMF and to cause information regarding the warning delivery related notification to be transmitted to the cell broadcast entity. The warning delivery notification comprises an indication related to a failure or a restart. In an example embodiment, the program code instructions configured to transform the warning message include program code instructions configured to interpret a warning message request provided by the cell broadcast entity and to generate a WRITE-REPLACE-WARNING-REQUEST message to be transmitted to the AMF. In an example embodiment, the program code instructions configured to receive the warning message via the first interface include program code instructions configured to utilize a protocol stack that supports an application layer protocol for transferring warning messages and a stream control transmission protocol for delivering signaling messages.

In yet another example embodiment, an apparatus is provided for performing a public warning system (PWS) function. The apparatus comprises means for receiving a warning message via a first interface, such as an SBc-like point to point interface. The warning message is provided by a cell broadcast entity. The apparatus also comprises means for transforming the warning message. The apparatus further comprises means for causing the warning message, as transformed, to be transmitted via a second interface, such as a service based interface different than the first interface, to an access and mobility management function (AMF) for transmission to a radio access network.

The warning message that is received in accordance with an example embodiment identifies a warning area. In this example embodiment, the warning message, as transformed, is transmitted to one or more radio access networks which broadcast over the warning area. The apparatus of an example embodiment also includes means for receiving a cancellation indication from the AMF including a broadcast cancelled area list and means for causing information regarding the cancellation indication to be transmitted to the cell broadcast entity. In an example embodiment, the apparatus also includes means for receiving a warning delivery related notification from the AMF and causing information regarding the warning delivery related notification to be transmitted to the cell broadcast entity. The warning delivery notification comprises an indication related to a failure or a restart. In an example embodiment, the means for transforming the warning message includes means for interpreting a warning message request provided by the cell broadcast entity and means for generating a WRITE-REPLACE-WARNING-REQUEST message to be transmitted to the AMF. In an example embodiment, the means for receiving the warning message via the first interface includes means for utilizing a protocol stack that supports an application layer protocol for transferring warning messages and a stream control transmission protocol for delivering signaling messages.

In an example embodiment, an apparatus is provided that is configured to perform a public warning system (PWS) function. The apparatus comprises at least one processor and at least one memory including computer program code for one or more programs with the at least one memory and the computer program code configured to, with the at least one processor, cause the apparatus at least to receive an emergency broadcast request warning message provided by a cell broadcast entity. In response to the emergency broadcast request warning message, the apparatus is also caused to cause a warning request to be transmitted to a radio access network via an access and mobility management function (AMF).

The apparatus of an example embodiment is further caused to receive a response from the radio access network via the AMF indicating that an emergency warning has been broadcast and, in response to the response, to cause an indication of completion of the emergency warning to be provided to the cell broadcast entity. In an example embodiment, the apparatus is further caused to receive a stop emergency broadcast request warning message provided by the cell broadcast entity and, in response to the stop emergency broadcast request warning message, cause a request to stop the warning request to be transmitted to the radio access network via the AMF. In this example embodiment, the apparatus is further caused to receive a response from the radio access network via the AMF indicating that the warning request has been stopped and, in response to the response, cause an indication of stopping of the warning request to be provided to the cell broadcast entity. The apparatus of an example embodiment is caused to receive the emergency broadcast request warning message utilizing a protocol stack that supports an application layer protocol for transferring warning messages and a stream control transmission protocol for delivering signaling messages.

In another example embodiment, a method is provided for performing a public warning system (PWS) function. The method comprises receiving an emergency broadcast request warning message provided by a cell broadcast entity. In response to the emergency broadcast request warning message, the method also comprises causing a warning request to be transmitted to a radio access network via an access and mobility management function (AMF).

The method of an example embodiment further comprises receiving a response from the radio access network via the AMF indicating that an emergency warning has been broadcast and, in response to the response, causing an indication of completion of the emergency warning to be provided to the cell broadcast entity. In an example embodiment, the method further comprises receiving a stop emergency broadcast request warning message provided by the cell broadcast entity and, in response to the stop emergency broadcast request warning message, causing a request to stop the warning request to be transmitted to the radio access network via the AMF. In this example embodiment, the method further comprises receiving a response from the radio access network via the AMF indicating that the warning request has been stopped and, in response to the response, causing an indication of stopping of the warning request to be provided to the cell broadcast entity. The method of an example embodiment receives the emergency broadcast request warning message by utilizing a protocol stack that supports an application layer protocol for transferring warning messages and a stream control transmission protocol for delivering signaling messages.

In a further example embodiment, a computer program product is provided for performing a public warning system (PWS) function. The computer program product comprises at least one non-transitory computer-readable storage medium having computer executable program code instructions stored therein with the computer executable program code instructions comprising program code instructions configured, upon execution, to receive an emergency broadcast request warning message provided by a cell broadcast entity. In response to the emergency broadcast request warning message, the computer executable program code instructions comprise program code instructions configured, upon execution, to also cause a warning request to be transmitted to a radio access network via an access and mobility management function (AMF).

The computer executable program code instructions of an example embodiment further comprise program code instructions configured, upon execution, to receive a response from the radio access network via the AMF indicating that an emergency warning has been broadcast and, in response to the response, to cause an indication of completion of the emergency warning to be provided to the cell broadcast entity. In an example embodiment, the computer executable program code instructions further comprise program code instructions configured, upon execution, to receive a stop emergency broadcast request warning message provided by the cell broadcast entity and, in response to the stop emergency broadcast request warning message, to cause a request to stop the warning request to be transmitted to the radio access network via the AMF. In this example embodiment, the computer executable program code instructions further comprise program code instructions configured, upon execution, to receive a response from the radio access network via the AMF indicating that the warning request has been stopped and, in response to the response, to cause an indication of stopping of the warning request to be provided to the cell broadcast entity. In an example embodiment, the program code instructions configured to receive the emergency broadcast request warning message include program code instructions configured to utilize a protocol stack that supports an application layer protocol for transferring warning messages and a stream control transmission protocol for delivering signaling messages.

In yet another example embodiment, an apparatus is provided for performing a public warning system (PWS) function. The apparatus comprises means for receiving an emergency broadcast request warning message provided by a cell broadcast entity. In response to the emergency broadcast request warning message, the apparatus also comprises means for causing a warning request to be transmitted to a radio access network via an access and mobility management function (AMF).

The apparatus of an example embodiment further comprises means for receiving a response from the radio access network via the AMF indicating that an emergency warning has been broadcast and, in response to the response, means for causing an indication of completion of the emergency warning to be provided to the cell broadcast entity. In an example embodiment, the apparatus further comprises means for receiving a stop emergency broadcast request warning message provided by the cell broadcast entity and, in response to the stop emergency broadcast request warning message, means for causing a request to stop the warning request to be transmitted to the radio access network via the AMF. In this example embodiment, the apparatus further comprises means for receiving a response from the radio access network via the AMF indicating that the warning request has been stopped and, in response to the response, means for causing an indication of stopping of the warning request to be provided to the cell broadcast entity. In an example embodiment, the means for receiv the emergency broadcast request warning message includes means for utilizing a protocol stack that supports an application layer protocol for transferring warning messages and a stream control transmission protocol for delivering signaling messages.

BRIEF DESCRIPTION OF THE DRAWINGS

Figure 1:
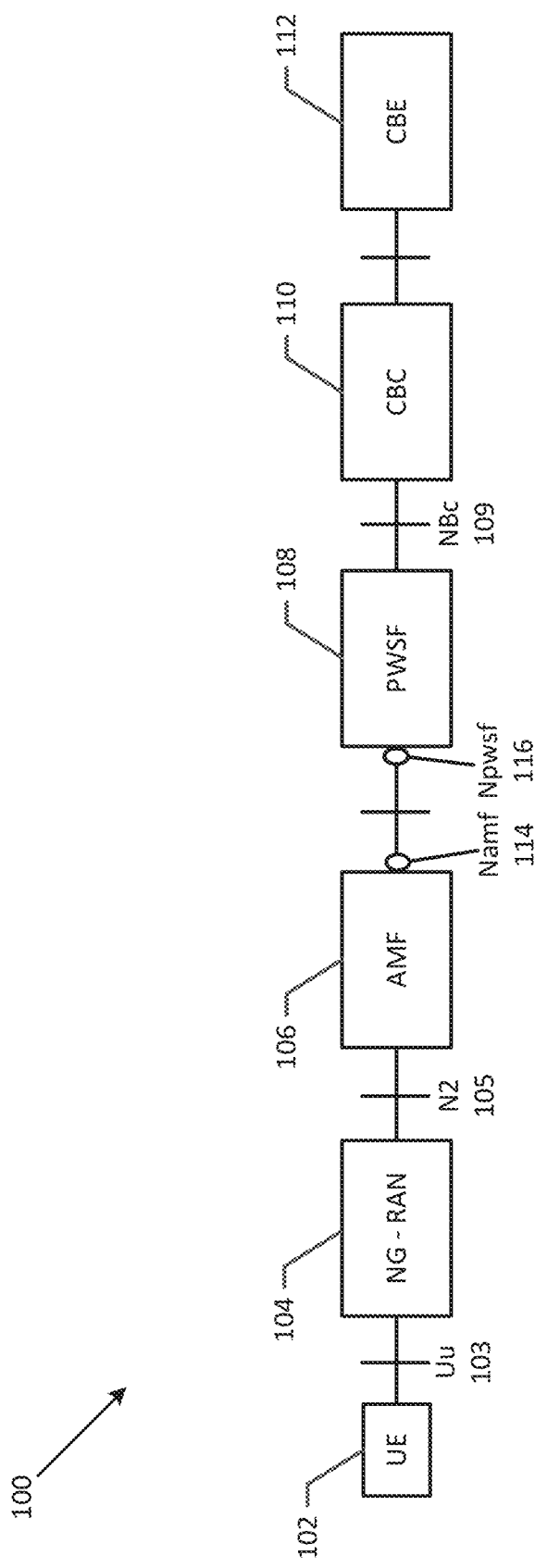
Figure 2A:
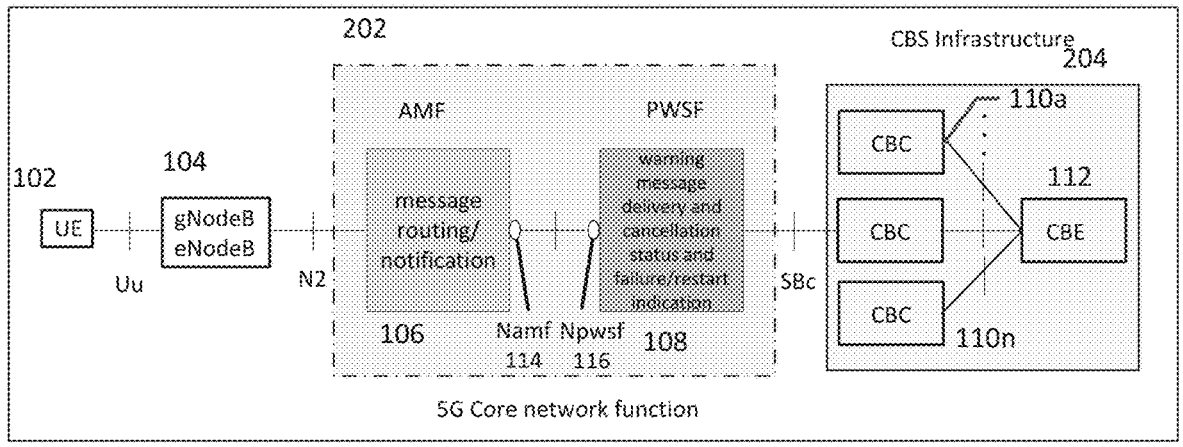
Figure 2B:
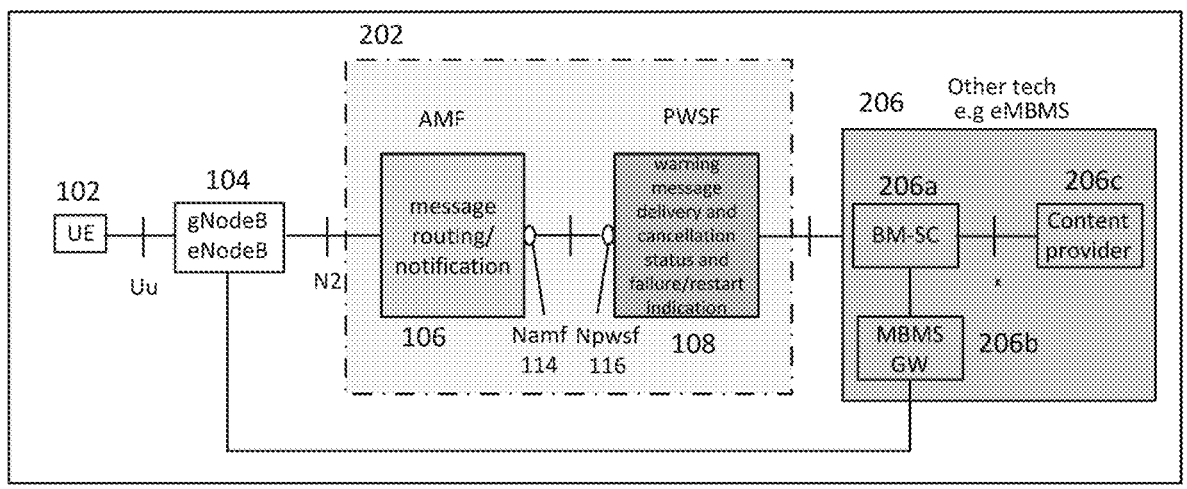
Figure 3:
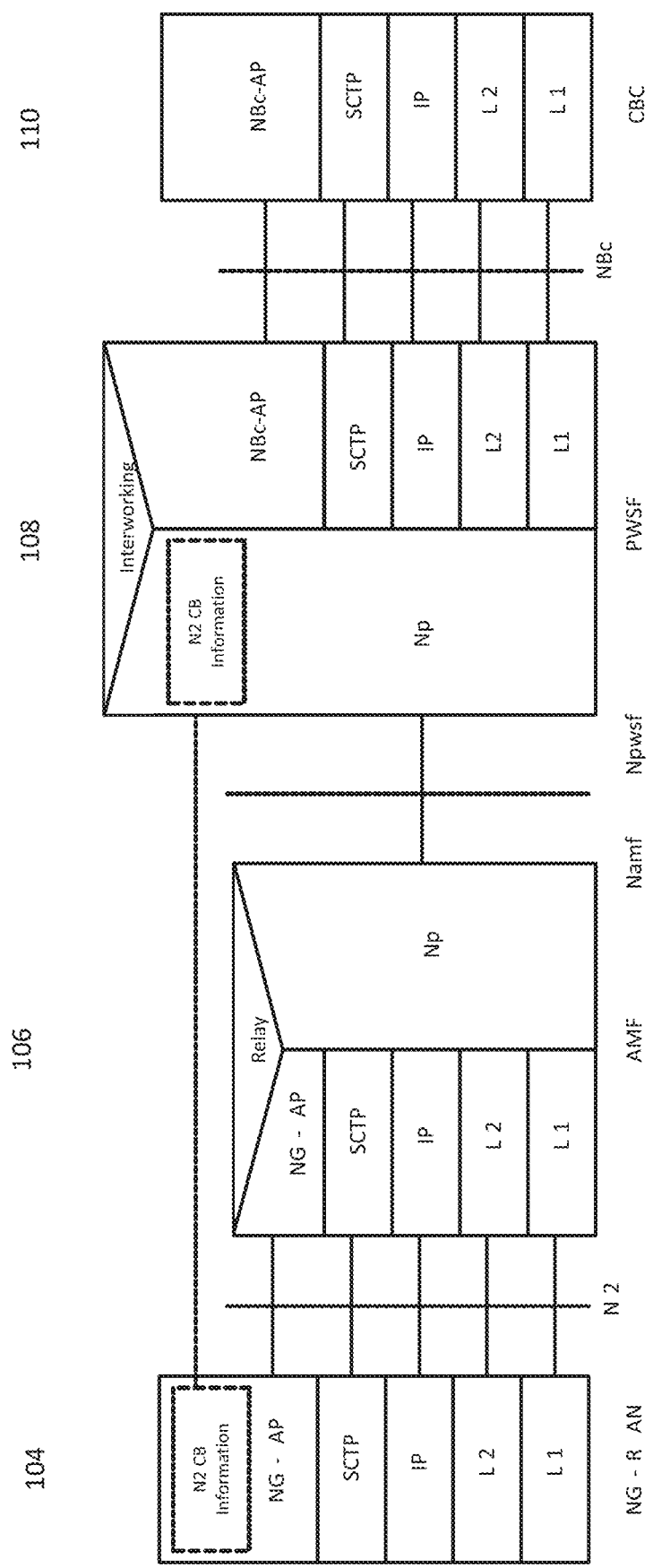
Figure 4:
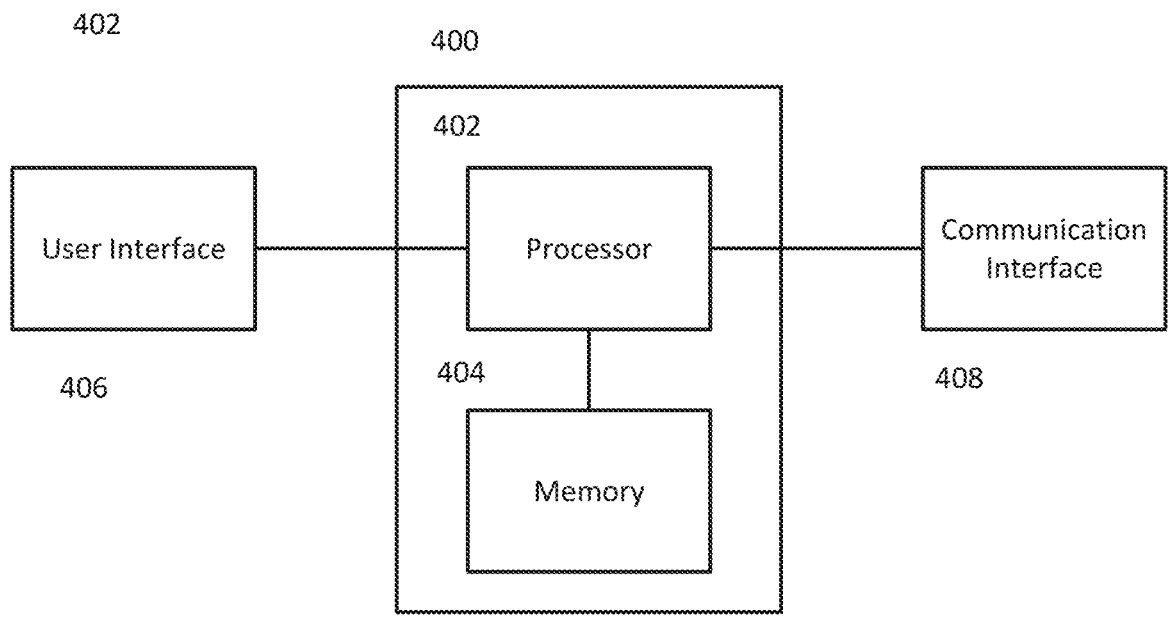
Figure 5:
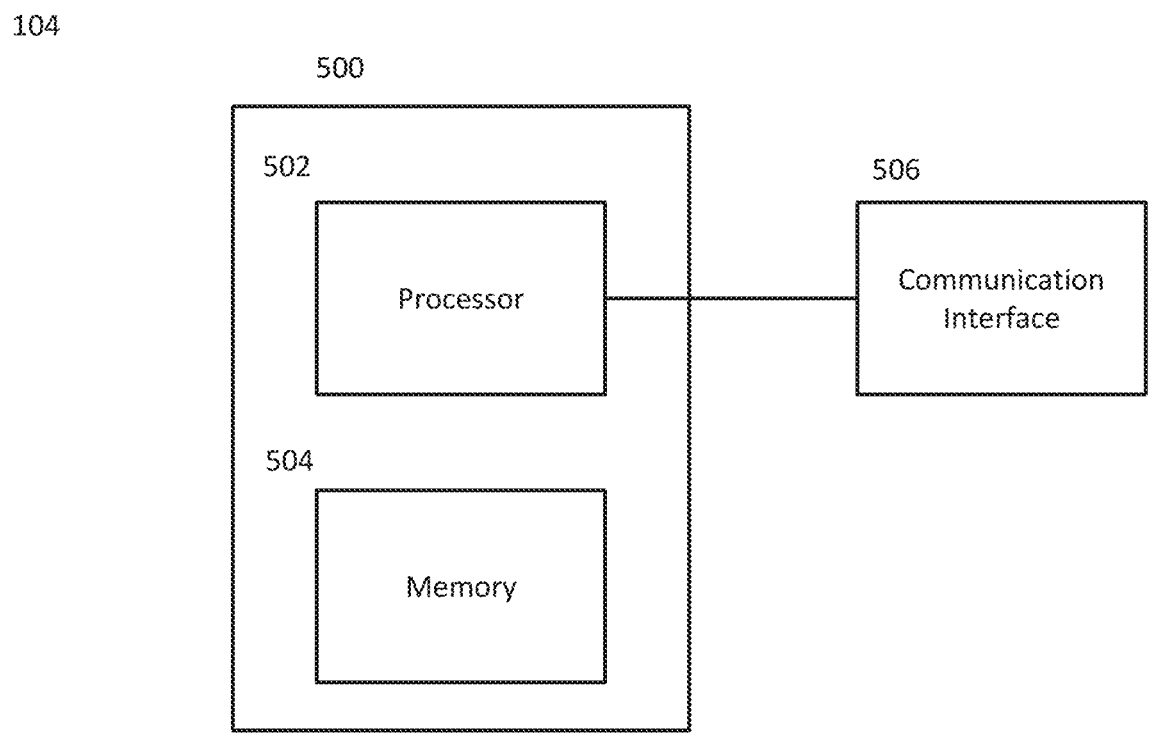
Figure 7:
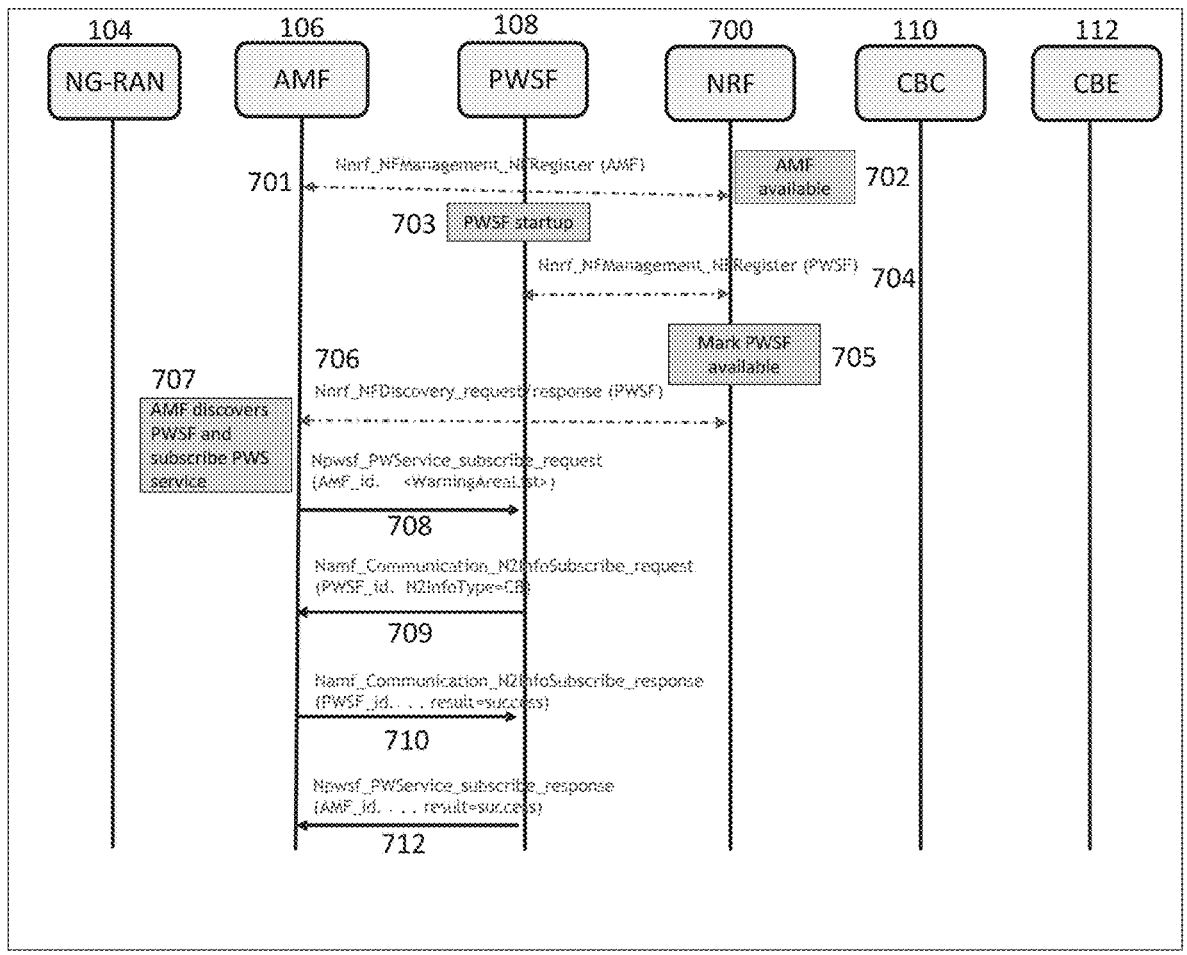
Figure 8:
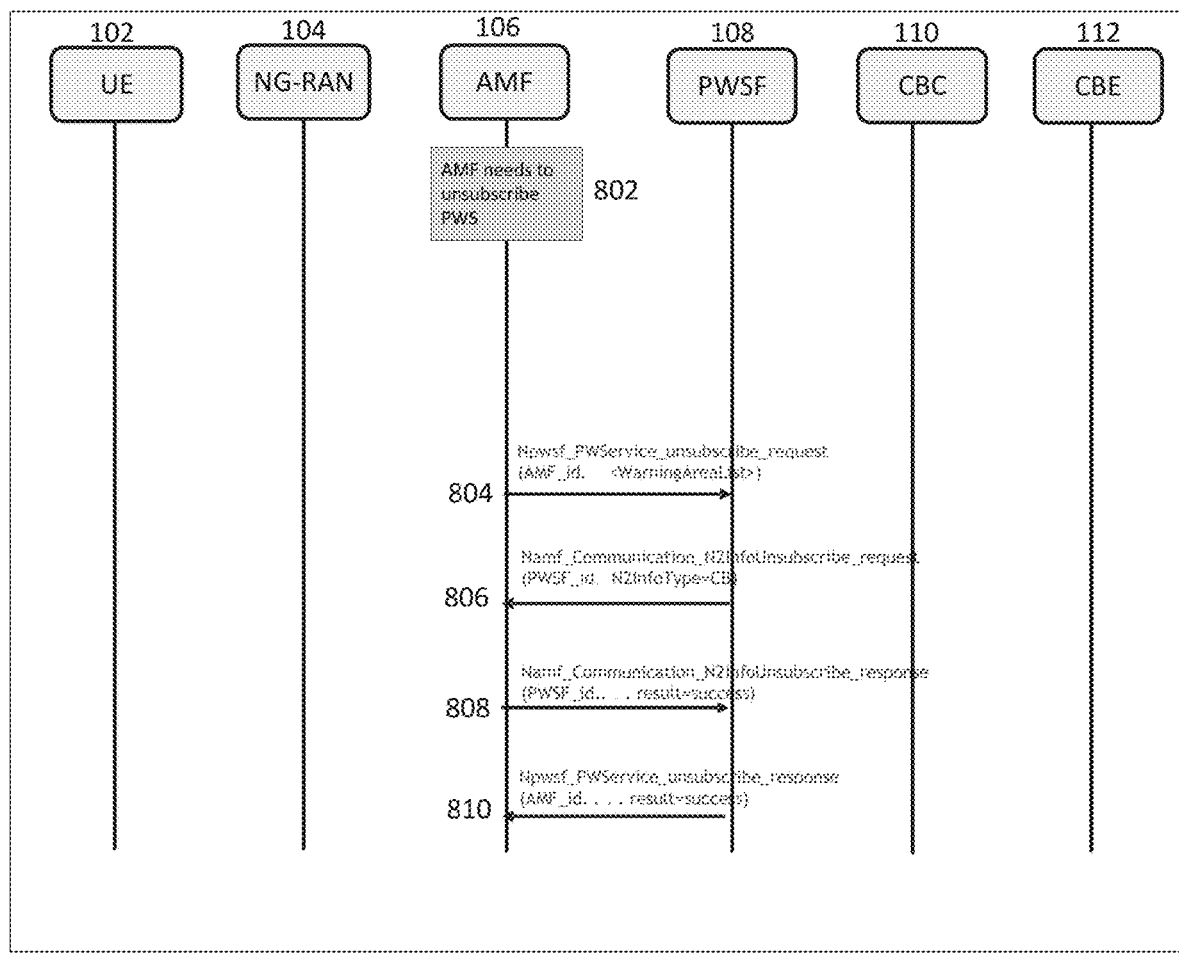
Figure 9:
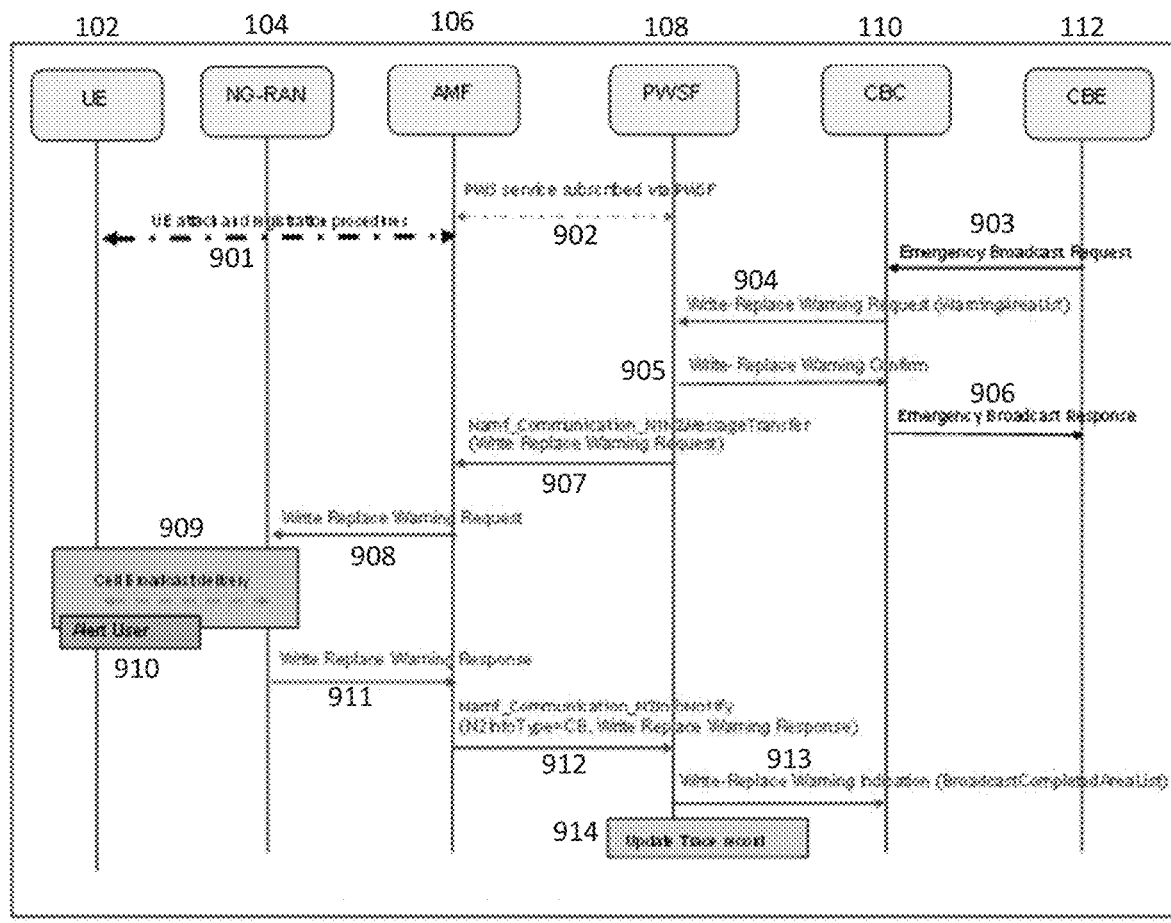
Figure 10:
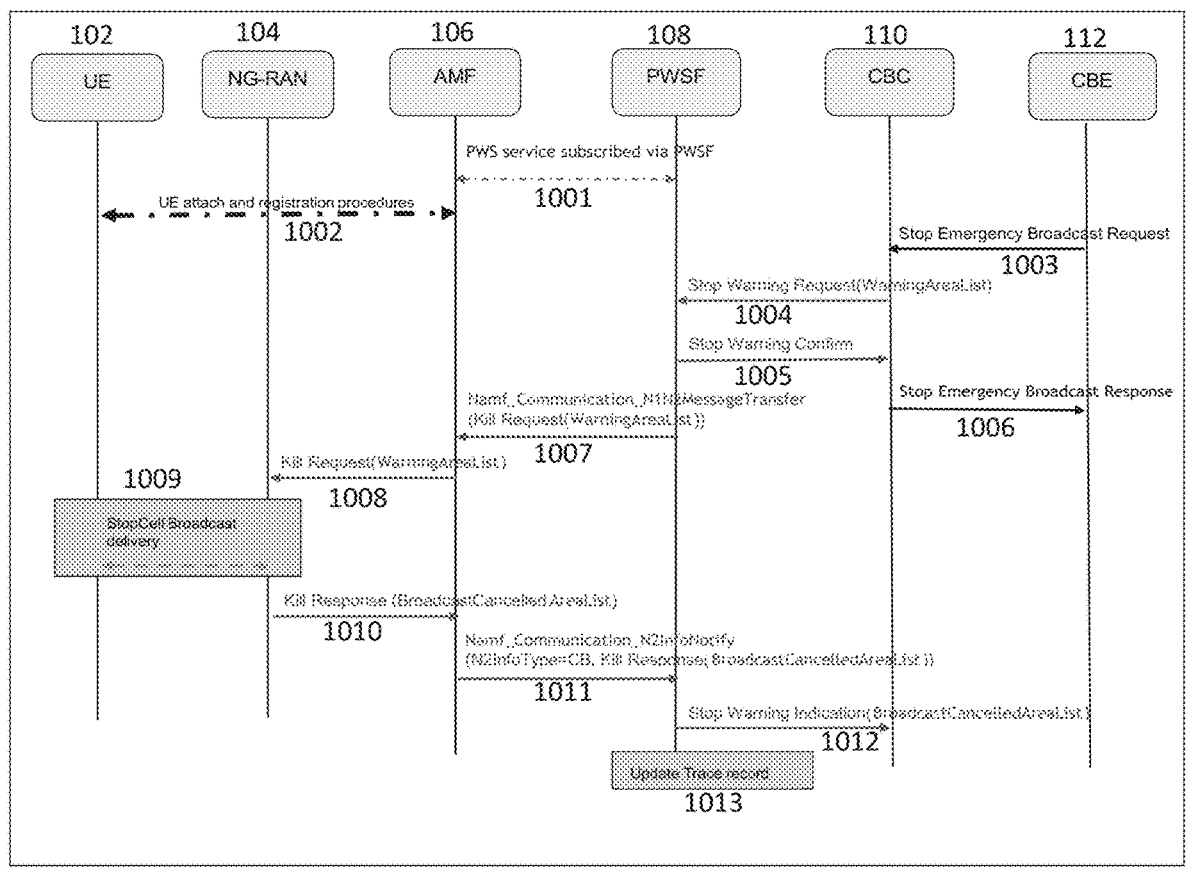
Figure 11:
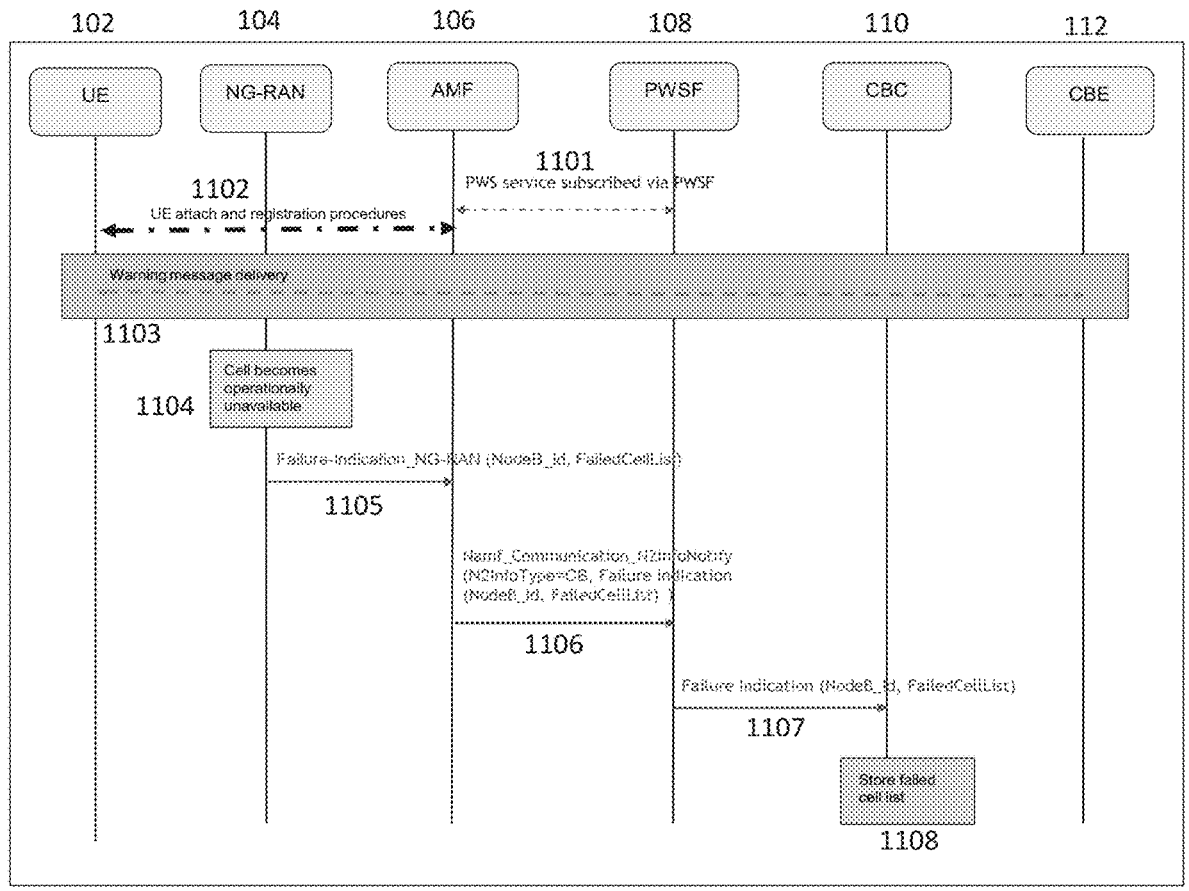
Figure 12:
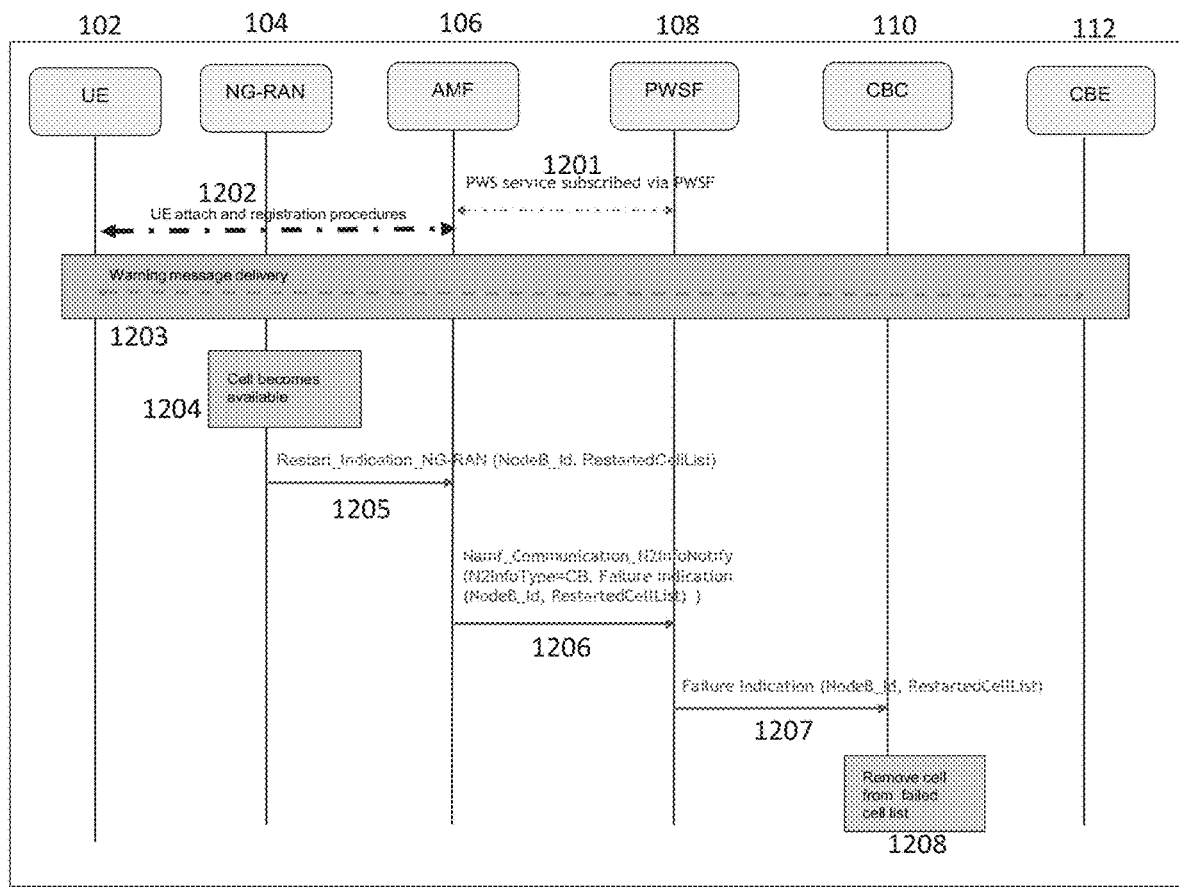
Figure 13:
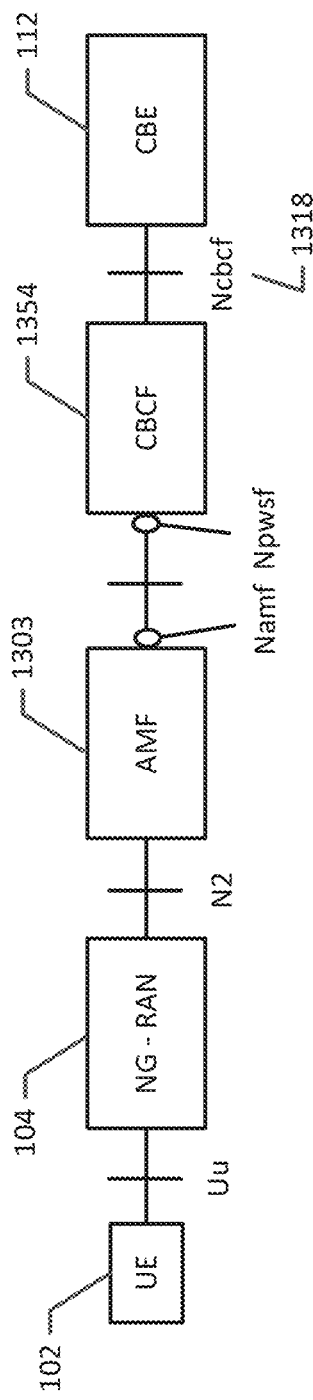
Figure 14A:
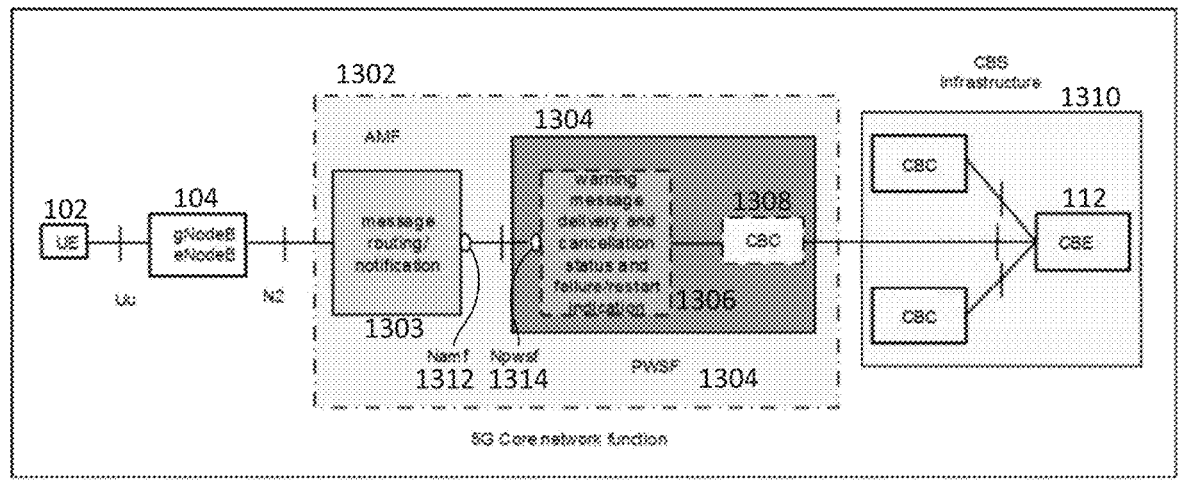
Figure 14B:
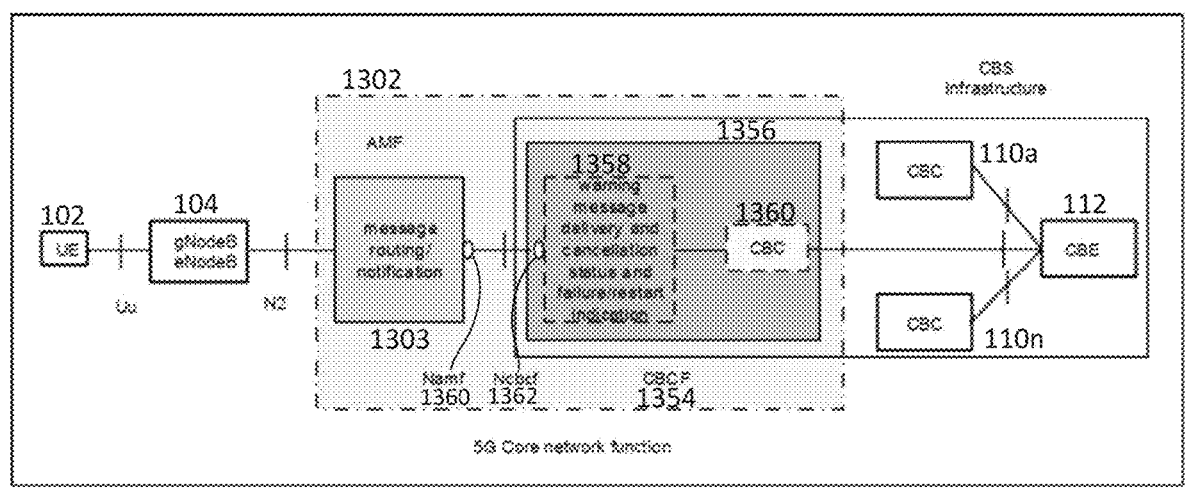
Figure 15:
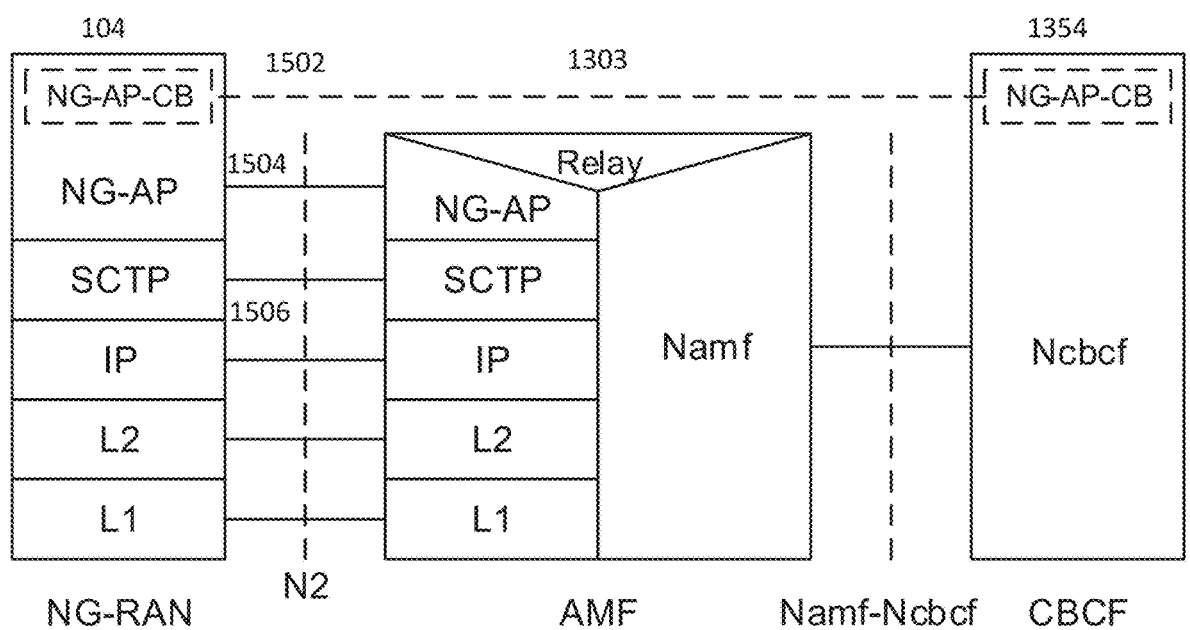
Figure 16:
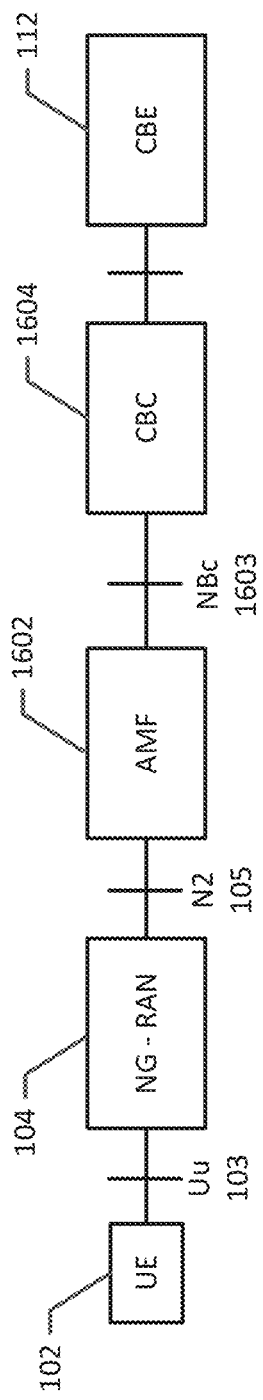
Figure 17:
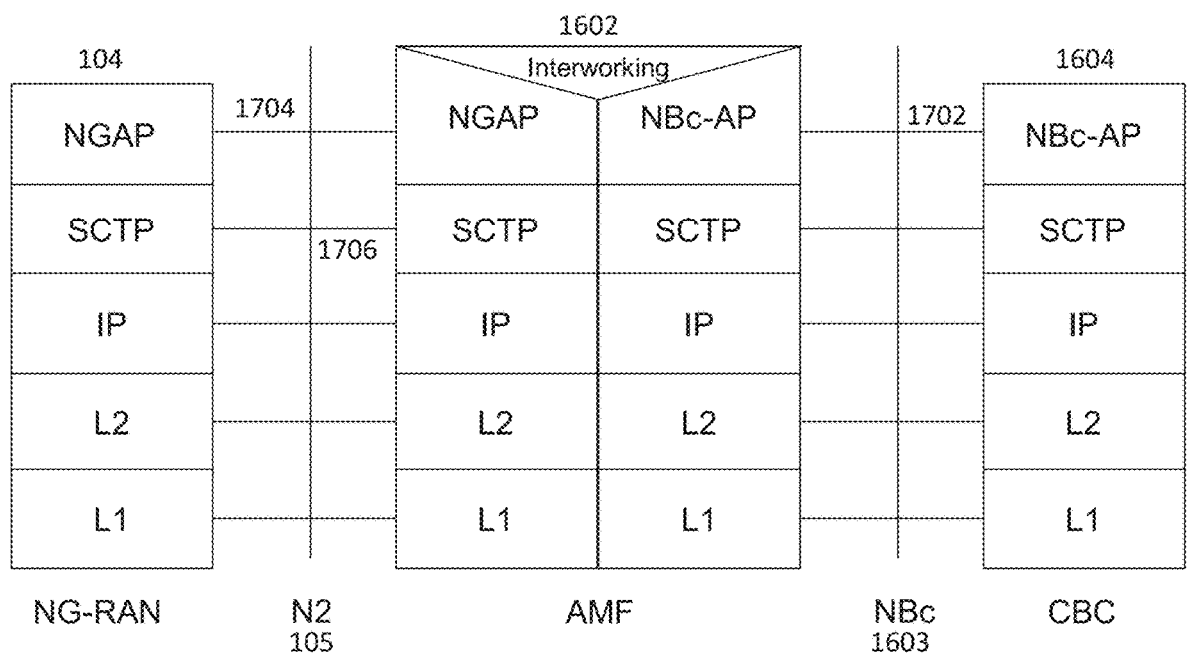
Figure 18:
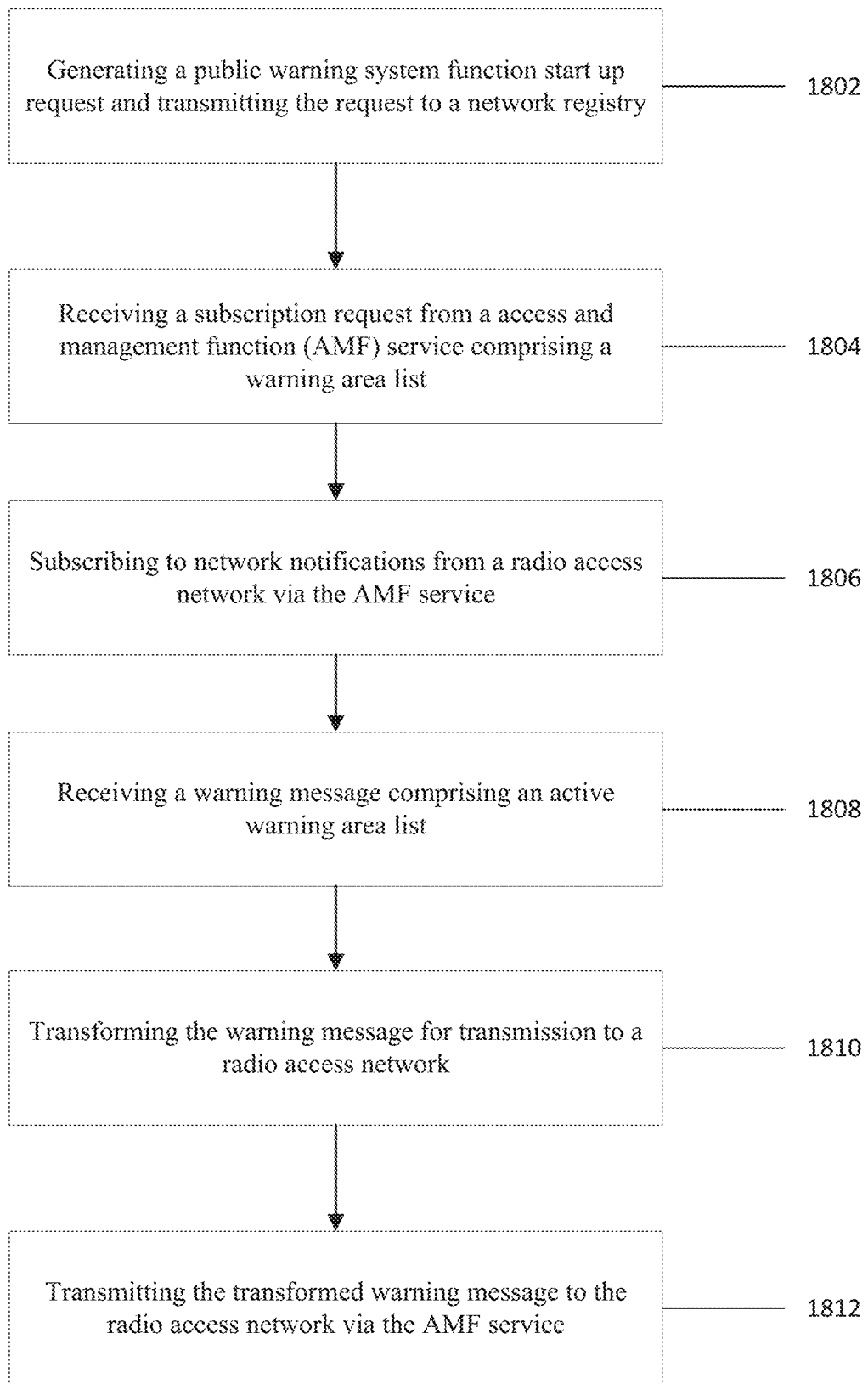

Having thus described certain example embodiments of the invention in general terms, reference will now be made to the accompanying drawings, which are not necessarily drawn to scale, and wherein:

FIG. 1 is a networked system in accordance with an example embodiment of the present disclosure;

FIGS. 2A-2B are block diagrams for the networked system shown in FIG. 1 in accordance with an example embodiment of the present disclosure;

FIG. 3 is a block diagram of a protocol stack for a control plane for the networked system shown in FIGS. 1, 2A, and 2B configured in accordance with an example embodiment of the present disclosure;

FIG. 4 is a block diagram of a user equipment apparatus configured in accordance with an example embodiment of the present disclosure;

FIG. 5 is a block diagram of a core network apparatus configured in accordance with an example embodiment of the present disclosure;

FIGS. 6A-6D illustrate example tables of operations and services performed by the networked system of FIG. 1 in accordance with example embodiments of the present disclosure;

FIG. 7 illustrates an end point flow diagram for service based PWS service subscription by the Core Access and Mobility Management Function (AMF) shown in FIG. 1;

FIG. 8 illustrates an end point flow diagram for service based PWS service unsubscription by the AMF shown in FIG. 1;

FIG. 9 illustrates an end point flow diagram for service based warning message delivery in the networked system shown in FIG. 1;

FIG. 10 illustrates an end point flow diagram for service based warning message cancellation in the networked system shown in FIG. 1;

FIG. 11 illustrates an end point flow diagram for NG-RAN failure indication via a service based interface in the networked system shown in FIG. 1;

FIG. 12 illustrates an end point flow diagram for NG-RAN restart indication via a service based interface in the networked system shown in FIG. 1;

FIG. 13 is an additional networked system in accordance with an example embodiment of the present disclosure;

FIGS. 14A-14B are block diagrams for the networked system shown in FIG. 13 in accordance with an example embodiment of the present disclosure;

FIG. 15 is a block diagram of a protocol stack for a control plane for the networked system shown in FIGS. 13, 14A, and 14B configured in accordance with an example embodiment of the present disclosure;

FIG. 16 is a further networked system in accordance with an example embodiment of the present disclosure;

FIG. 17 is a block diagram of a protocol stack for a control plane for the networked system shown in FIG. 16 configured in accordance with an example embodiment of the present disclosure; and FIG. 18 is a flowchart illustrating providing a warning message via a PWS system in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Currently, public warning system (PWS) functionality in both the fourth generation (4G) Long Term Evolution (LTE) standard as well as in the second and third generation (2G/3G) core network standards is realized using Cell Broadcast (CB) technology through Cell Broadcast service (CBS) message broadcasting. While 5G standards are service based, it is expected that the same CBS technology framework may be used for technical realization of PWS in the 5G system standards since some networks may rely on legacy network elements into the future while adopting the broader 5G standards.

For example, the cell broadcast center (CBC), which is part of the core network that is responsible for the management of CBS messages, is a legacy network element that is widely deployed in wireless communication networks and in turn the CBC may be connected to a wide variety of other legacy network elements such as Base Station Controllers (BSCs)/Radio Network Controller (RNCs)/Mobility Management Entities (MMEs) as well as Cell Broadcast Entities (CBEs) via point to point interfaces. Adding a flexible PWS architecture for the 5G system that can be service based yet adaptive to existing network deployments while at the same time reducing development and maintenance efforts and avoiding or reducing disruption to current PWS operations becomes a major challenge which is addressed by the PWSF described herein.

A method, apparatus and computer program product are therefore provided in accordance with an example embodiment to provide a service based public warning system interface.

FIG. 1 is a networked system in accordance with an example embodiment of the present disclosure. As shown in FIG. 1, a PWS function (PWSF) 108 is configured to provide warning message delivery and cancellation status tracking and failure/restart indication handling. The PWSF 108 is part of the 5G core network and connected to the Core Access and Mobility Management Function (AMF) 106 via a service-based interface exhibited by PWSF (Npwsf) 116.

The AMF 106 interfaces with the PWSF 108 and a next generation radio access network (NG-RAN) 104 to enable PWS service where the interface between AMF and PWSF is implemented as a service based interface. The PWSF 108 uses the AMF 106 communication services to forward warning messages to the NG-RAN 104 and to subscribe to receive warning delivery and cancellation indications as well as NG-RAN failure and restart related notifications towards the PWSF 108. The NG-RAN 104 may be New Radio (NR) based or Evolved Universal Mobile Telecommunications System Terrestrial Radio Access (E-UTRA) based. The PWSF connects to a CBC 110 using an SBc-like point to point interface to the CBC (e.g., NBc 109). A similar protocol stack and procedures for the SBc interface may be re-used for the NBc interface.

Uu 103 refers to the reference point between a User Equipment 102 and the NG-RAN 104. N2 105 refers to the reference point between the NG-RAN and the AMF. Namf 114 refers to the service-based interface exhibited by AMF.

FIGS. 2A and 2B are block diagrams representing the networked system shown in FIG. 1 in accordance with an example embodiment of the present disclosure. As shown in FIG. 2B the PWSF 108 is an interface that may be configured in accordance with further technologies such as in cases where multicasting needs to be supported or other technical realization methods need to be used in the future standard releases. As shown in accordance with one example embodiment, the interface between the AMF and PWSF can remain unchanged and only a new interface from the PWSF toward a new function may need be implemented (e.g., Broadcast Multicast Service Center (BM-SC) if Evolved Multimedia Broadcast Multicast Service (eMBMS) is used for implementing PWS service).

The AMF 106 as shown in FIGS. 1-2B may interface to one PWSF 108. The AMF 106 may interface to several NG-RANs (e.g., combinations of base stations, such as gNodeBs and/or eNodeBs as shown in FIGS. 2A and 2B).

The AMF 106 is configured to route a WRITE-REPLACE-WARNING-REQUEST message to the appropriate NG-RAN 104 entities upon receiving a warning message request from the PWSF 108. The appropriate NG-RANs are those NG-RANs which broadcast over the area for which a warning message is intended as defined in a warning area list. The AMF 106 is configured to route a STOP-WARNING-REQUEST message to the appropriate NG-RAN 104 entities upon receiving a STOP-WARNING-REQUEST message from the PWSF 108. The appropriate NG-RANs are those NG-RANs which broadcast over the area for which a stop warning message is intended as defined in a warning area list The AMF 106 is also configured to forward a PWS RESTART-INDICATION message and a PWS FAILURE-INDICATION message received from the NG-RAN 104 entities to the PWSF 108.

The PWSF 108 as shown in FIGS. 1-2B is a network function in a 5G core network 202. The PWSF 108 may interface to one CBC 110 or multiple CBCs (110A-110N) as shown in FIG. 2A. The PWSF 108 supports the service based interface Npswf 116 with the AMF 106. The PWSF 108 uses AMF communication services to forward warning messages to the NG-RAN 104 and to subscribe to receive warning delivery related notifications.

The PWSF 108 is configured to interpret and store commands from the CBC 110 and utilize the AMF 106 and the service based interfaces 114 and 116 to route a WRITE-REPLACE-WARNING-REQUEST message to appropriate NG-RAN 104 entities upon receiving a warning message request from the CBC 110. The appropriate NG-RANs are those NG-RANs which broadcast over the area for which a warning message is intended as defined in a warning area list The PWSF 108 is configured to use the AMF 106 service based interface to route a STOP-WARNING-REQUEST message to appropriate NG-RAN 104 entities upon receiving a STOP-WARNING-REQUEST message from the CBC 110. The appropriate NG-RANs are those NG-RANs which broadcast over the area for which a stop warning message is intended as defined in a warning area list The PWSF 108 is also configured to provide warning message delivery success or failure notifications by providing to the CBC 110 acknowledgement of successful execution of commands received from the CBC 110, reporting a failure to the CBC 110 when a command received from the CBC is not understood or cannot be executed, and reporting to the CBC 110 a broadcast completed area list and a broadcast cancelled area list.

The PWSF 108 is also configured to subscribe to the AMF 106 to receive warning delivery related notifications and forward a PWS RESTART-INDICATION message and a PWS FAILURE-INDICATION message received from the AMF 106 to all CBCs (110A-110N) with which the PWSF 108 interfaces.

The CBC 110 may be connected to several PWSFs 108. The CBC may be also be connected to several CBEs 112. The CBC 110 is also is configured to manage CBS messages.

The NG-RAN 104 may interface to multiple AMFs 106. The NG-RAN 104 is configured to, upon receipt of a WRITE-REPLACE-WARNING-REQUEST message, prioritize its resources and broadcast a warning message to the warning areas indicated in a requested Warning area list.

The NG-RAN 104 is also configured to, upon receipt of a KILL-REQUEST message, stop broadcasting the warning message within an area indicated in the requested warning area list and discard the warning message.

The NG-RAN 104 is also further configured to inform the AMF 106 that PWS information for some or all cells of the NG-RAN 104 are available for reloading from a PWSF or Call Broadcast Center Function (CBCF) if needed by sending a RESTART-INDICATION_NG-RAN message to the AMF 106.

The NG-RAN 104 is also configured to inform the AMF 106 that ongoing PWS operation for one or more cells of the NG-RAN 104 has failed by sending a PWS FAILURE-INDICATION_NG-RAN message to the AMF 106.

Examples of a UE apparatus (UE 102) are configured in accordance with an example embodiment of the present disclosure as depicted in FIG. 4. The UE 102 of an example embodiment may be configured to perform the functions described herein. In any instance, the apparatus may more generally be embodied by a computing device, such as a server, a personal computer, a computer workstation or other type of computing device including those functioning as a user equipment and/or a wireless local area network. Regardless of the manner in which the UE 102 is embodied, the apparatus of an example embodiment may be configured as shown in FIG. 4 so as to include, be associated with or otherwise be in communication with processing circuitry 400 including, for example, a processor 402 and a memory 404, and, in some embodiments, a communication interface 408 and/or a user interface 406.

In the processing circuitry 400, the processor 402 (and/or co-processors or any other circuitry assisting or otherwise associated with the processor) may be in communication with the memory device 404 via a bus for passing information among components of the UE 102. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor, such as storing a warning message to be executed by the processor and displayed on the user interface 406.

The UE 102 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 402 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 402 may be configured to execute instructions stored in the memory device 404 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 408, the communication interface may be any means such as a device or circuitry embodied in either hardware or a combination of hardware and software that is configured to receive and/or transmit data from/to a network and/or any other device or module in communication with the UE 102, such as an wireless local area network (WLAN), core network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the UE 102 may optionally include a user interface 406 that may, in turn, be in communication with the processing circuitry 400 to receive an indication of a user input and/or to cause presentation of visual representations of the functions described herein, or the warning described. As such, the user interface may include, for example, a keyboard, a mouse, a joystick, a display, a touch screen(s), touch areas, soft keys, a microphone, a speaker, or other input/output mechanisms. Alternatively or additionally, the processing circuitry may comprise user interface circuitry configured to control at least some functions of one or more user interface elements such as, for example, a speaker, ringer, microphone, display, and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 404, and/or the like).

Examples of a core network apparatus (including core network apparatus 202 shown in FIGS. 2A and 2B) as configured in accordance with an example embodiment of the present disclosure are depicted in FIG. 5. As described below in conjunction with the flow diagrams of FIGS. 7-12, the core network apparatus 202 of an example embodiment may be configured to perform the functions described herein such as the functions of the PWSF 108. In any instance, the core network apparatus 202 may more generally be embodied by a computing device, such as a one or more servers or other networked computing devices, that comprise a portion, e.g., a component, of the core network. Regardless of the manner in which the core network apparatus 202 is embodied, the apparatus of an example embodiment may be configured as shown in FIG. 5 so as to include, be associated with or otherwise be in communication with processing circuitry 500 including, for example, a processor 502 and a memory 504 and, in some embodiments, and/or a communication interface 506.

In the processing circuitry 500, the processor 502 (and/or co-processors or any other circuitry assisting or otherwise associated with the processor) may be in communication with the memory device 504 via a bus for passing information among components of the core network 202. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The core network 202 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 502 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 502 may be configured to execute instructions stored in the memory device 504 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 506, the communication interface may be any means such as a device or circuitry embodied in either hardware or a combination of hardware and software that is configured to receive and/or transmit data from/to a network and/or any other device or module in communication with the core network 202, such as a UE, network elements of the same or different network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 is a block diagram of a protocol stack for a control plane for the networked system shown in FIGS. 1, 2A, and 2B configured in accordance with an example embodiment of the present disclosure. As shown, the N2 CB information 302 is a subset of NG-AP information carrying cell broadcasting information with embedded PWS primitives which the AMF 106 transparently relays between the NG-RAN 104 and the PWSF 108.

The NG Application Protocol (NGAP) 304 is an Application Layer Protocol between the NG-RAN 104 entity (e.g., eNodeB and/or gNodeB) and the AMF 106.

The NBc Application Protocol (NBc-AP) 306 is an Application Layer Protocol between the PWSF 108 and the CBC 110. This protocol supports the transfer of warning messages.

Furthermore, the Stream Control Transmission Protocol (SCTP) for the control plane (SCTP) 308 guarantees delivery of signaling messages between the AMF 104 and the NG-RAN (by interface N2 103) and between the PWSF 108 and the CBC 110 (by interface NBc 109).

Reference is now made to FIG. 6A, which is a table of PWSF-AMF interface operations. In some examples, the PWSF 108 uses the Namf_Communication (namf 114) service to communicate with the NG-RAN 104 for sending warning request primitives and receiving warning message delivery indication or restart/failure indication primitives. Table 1 shown in FIG. 6A shows the services/primitives supported by the interface and the corresponding service operations.

FIG. 6B is a table of CBC—PWSF interface operations. In some examples, the CBC network function uses the PWSF 108 to communicate with the NG-RAN 104 for sending warning request primitives and receiving warning message delivery indication or restart/failure indication primitives. Table 2 shown in FIG. 6B shows primitives that are expected to be supported using AMF via the Namf interface.

FIG. 6C shows Table 3 which lists AMF services. The PWSF network function uses the Namf_Communication (Namf 114) service to communicate with the NG-RAN for sending warning request primitives and receiving warning message delivery indication or restart/failure indication primitives.

FIG. 6D shows Table 4 which lists PWSF services. The AMF 106 subscribes to PWSF's Npwsf_PWService (Npswf 116) for receiving a PWS broadcast.

As shown in FIG. 6D, the Npwsf_PWService_Subscribe service operation includes Npwsf_PWService_Subscribe, which the AMF 106 invokes to subscribe to receive a PWS message broadcast from the CBC 110 for the configured warning areas. Required inputs into the service include AMF_Id and a warning area list. The required output includes a subscribe result.

As also shown in FIG. 6D, the Npwsf_PWService_Subscribe service operation includes Npwsf_PWService_unsubscribe, which the AMF 106 invokes to unsubscribe to receive PWS message broadcast from CBC for the configured warning areas. Required inputs into the service include AMF_Id. The required output includes a subscribe result.

FIG. 7 illustrates an end point flow diagram for service based PWS service subscription by the AMF 106 as shown in FIG. 1. At operations 701-705 the PWSF 108 starts up and registers with core network function register (NRF) 700.

As shown in operations 706-707, the AMF 106 discovers the PWSF 108 via the NRF 700.

As shown in operations 708, the AMF 106 subscribes to the PWS service by invoking the Npwsf_PWService_subscribe service operation, including an optional warning area list for which the AMF is responsible. The PWSF 108 stores the AMF information and in turn subscribes to N2 notifications from the NG-RAN 104 by invoking the Namf_Communication_N2InfoSubscribe service operation in operations 709-710.

In operation 712, the PWSF 108 informs AMF 106 that the subscribe attempt for the PWS service is successful.

FIG. 8 illustrates an end point flow diagram for service based PWS service unsubscription by the AMF shown in FIG. 1. At operation 802, the AMF 106 determines that is needs to unsubscribed from the PWS service. At operation 803, the AMF unsubscribes from the PWS service by invoking the Npwsf_PWService_unsubscribe service operation, including an optional warning area list for which the AMF is responsible.

At operations 806 and 808, the PWSF 108 removes the AMF 104 from an AMF_for_PWS_list and updates a warning area list. The PWSF 108 in turn unsubscribes from the N2 notification from NG-RAN by invoking the Namf_Communication_N2InfoUnsubscribe service operation. At operation 810, the PWSF informs the AMF 106 that unsubscribing for PWS service is successful.

FIG. 9 illustrates an end point flow diagram for service based warning message delivery in the networked system shown in FIG. 1. As shown in operations 901 and 902, the PWS service is subscribed to via the PWSF such as described in FIG. 7 and the UE 102 is attached to the mobile network via the NG-RAN 104. At operation 903, the CBE 112 sends emergency information to the CBC 110. At operation 904, the CBC 100 sends a Write-Replace Warning Request message containing the warning message to be broadcast and the delivery attributes including a Message identifier to the PWSF 108.

At operation 905, the PWSF 905 sends a Write-Replace Warning Confirm message that indicates to the CBC 110 that the PWSF 108 has started to distribute the warning message to the NG-RANs 104. At operation 906, upon reception of the Write-Replace Confirm messages from the PWSF, the CBC may confirm to the CBE that it has started to distribute the warning message.

At operation 907, the PWSF 108 invokes the Namf_Communication_N1N2MessageTransfer service operation on the AMF 106 in order to transfer the warning message towards the NG-RAN 104.

The AMF 106 sends or relays the N2 Write-Replace Warning Request message to the NG-RANs 104. The NG-RANs 104 then use the Warning Area information to determine to which cell(s) the message is to be broadcasted in operation 909.

At operation 910, the NG-RAN 104 broadcasts the received warning message (including repetitions) to the UEs 102. If the UE 102 has been configured to receive warning messages, and the UE is configured to accept warnings on that PLMN, then the UE activates reception of the broadcast messages containing the "warning message" and indicates the contents of the "warning message" to the user.

At operation 911, the NG-RAN 104 returns a Write-Replace Warning Response to the AMF 106. The AMF 106 notifies the PWSF 108 by invoking the Namf_Communication_N2InfoNotify service operation with N2InfoType indicating CB (cell broadcast) if the PWSF 108 has subscribed to the N2Info notification at operation 912.

At operation 914, the PWSF 108 determines the success or failure of the delivery and creates and/or updates a trace record. If the Send Warning-Message-Indication parameter was present in the Write-Replace Warning Request, the PWSF sends a Write-Replace Warning Indication(s) to the CBC with the Broadcast Completed Area Lists at operation 913.

FIG. 10 illustrates an end point flow diagram for service based warning message cancellation in the networked system shown in FIG. 1. As shown in operations 1001 and 1002, the PWS service is subscribed to via the PWSF such as described in FIG. 7 and the UE 102 is attached to the mobile network via the NG-RAN 104. At operation 1003, the CBE 112 initiates the cancellation procedure by sending a Stop Emergency Broadcast Request to stop the on-going broadcast of warning messages. At operation 1004, the CBC sends a Stop Warning Request message including a message identifier to the PWSF 108.

At operation 1005, the PWSF 108 sends a Stop Warning Confirm message that indicates to the CBC 110 that the PWSF 108 has started to distribute the Kill Request to the NG-RANs 104. Upon reception of the Stop Warning Confirm message from the PWSF 108, the CBC 110 may confirm to the CBE 112 that it has initiated the Warning message cancel procedure at operation 1006.

At operation 1007, the PWSF 108 invokes the Namf_Communication_N1N2MessageTransfer service operation on the AMF 106 to transfer the Kill Request message towards the NG-RAN 104.

At operation 1008, the AMF 106 sends the N2 Kill Request message to the NG-RANs 104. The NG-RANs 104 then stop broadcasting the warning message identified by the Message Identifier and Serial Number in the areas identified by Warning Area IDs in operation 1009.

The NG-RAN 104 returns a Kill Response to the AMF 106 in operation 1010. In response, at operation 1011, the AMF 1011 notifies the PWSF 108 by invoking the Namf_Communication_N2InfoNotify service operation with N2InfoType indicating CB (cell broadcast) if the PWSF 108 has subscribed to the N2Info notification.

At operation 1012, if the Stop Warning Indication parameter was present in the Stop Warning Request, the PWSF 108 sends the Stop Warning Indication to the CBC with the Broadcast Cancelled Area Lists.

FIG. 11 illustrates an end point flow diagram for NG-RAN failure indication via a service based interface in the networked system shown in FIG. 1. As shown in operations 1101 and 1102, the PWS service is subscribed to via the PWSF such as described in FIG. 7 and the UE 102 is attached to the mobile network via the NG-RAN 104. In operation 1103, a warning message is deliver to UE 102 such as described in FIG. 9. In operation 1104, the NG-RAN 104 detects one or more cells are not currently operational, and the NG-RAN then reports the failure towards the PWSF 108 via the AMF 106 with the failed cell list in a NG-RAN Failure Indication message with the failure reason at operation 1105. At operation 1106, the AMF notifies the PWSF by invoking a Namf_Communication_N2InfoNotify service operation with N2InfoType indicating CB (cell broadcast) if the PWSF 108 has subscribed to the N2Info notification.

At operation 1107, the PWSF 108 forwards the Failure Indication message towards the CBC 110 and the CBC 110 stores the failed cells in a failed cell lists at operation 1108.

FIG. 12 illustrates an end point flow diagram for an NG-RAN restart indication via a service based interface in the networked system shown in FIG. 1. As shown in operations 1201 and 1202, the PWS service is subscribed to via the PWSF such as described in FIG. 7 and the UE 102 is attached to the mobile network via the NG-RAN 104. In operation 1203, a warning message is deliver to UE 102 such as described in FIG. 9. At operation 1204, the NG-RAN 104 detects one or more cells are available for PWS, and the NG-RAN then sends an NG-RAN Restart Indication message with the list of cell(s) that are again available for broadcast of warning messages to the AMF 106 at operation 1205.

At operation 1206, the AMF 1206 sends a Restart Indication notification to the PWSF 108 by invoking the Namf_Communication_N2InfoNotify service operation with N2InfoType indicating CB (cell broadcast) if the PWSF has subscribed to the N2Info notification. At operations 1207 and 1208, the PWSF 108 forwards the Restart Indication message towards the CBC 110 and the CBC 110 removes the cell(s) from failed cell lists.

FIG. 13 is an additional networked system in accordance with an example embodiment of the present disclosure. As shown in FIG. 13, the AMF interfaces with CBCF 1354 and the NG-RAN 104 to enable PWS service with the interface between AMF 1303 and the CBCF 1354, implemented as service based interface. The CBCF 1354 uses the AMF 1303 communication services to forward warning messages to the NG-RAN 104 and to subscribe to receive warning delivery related notifications. The CBCF 1354 is part of the core network and connected to the AMF via the Ncbcf 1314 service based interface.

In some examples, the CBCF function 1354 can be realized by merging/co-locating PWSF function into existing CBC function as shown in FIG. 14B.

FIGS. 14A-14B are block diagrams for the networked system shown in FIG. 13 in accordance with an example embodiment of the present disclosure. The illustrated architecture alternative can be seen as a deployment variation of the architecture specified in FIGS. 2A and 2B by combining/co-locating PWSF functionality and CBC functionality into one entity called "PWSF" function 1304 (as shown in FIG. 14A) or called "5G-CBCF" function 1354 (as shown in FIG. 14B).

As shown in FIGS. 13-14B, the AMF 1303 may interface to one CBCF 1354 or multiple CBCFs. The AMF 1303 may interface to several NG-RANs 104 (e.g., combinations of gNodeBs and/or eNodeBs). The AMF 106 is configured to route a WRITE-REPLACE-WARNING-REQUEST message to the appropriate NG-RAN 104 entities upon receiving a warning message request from the CBCF and to route a STOP-WARNING-REQUEST message to the appropriate NG-RAN entities upon receiving a STOP-WARNING-REQUEST message from the CBCF. The AMF 1303 is also configured to send a warning message delivery success or failure notification and provide an acknowledgement of successful execution of commands received from the CBCF 1354 to the CBCF 1354.

The AMF 1303 is also configured to report a failure when a command received from the CBCF 1354 is not understood or cannot be executed to the CBCF 1354 and report a Broadcast completed area list and a Broadcast cancelled area list to the CBCF 1354. The AMF 1303 is also configured to forward a PWS RESTART-INDICATION message and a PWS FAILURE-INDICATION message received from the NG-RAN 104 entities to all CBCFs 1354 with which the AMF interfaces.

The CBCF 1354 is a network function in the 5G core network. The CBCF may be connected to several AMFs

1303. The CBCF 1354 may be connected to several CBEs 112. The CBCF 1354 is configured to manage CBS messages.

CBCF 1354 is also configured to support a service based interface and use AMF communication services to forward warning messages to NG-RAN 104 and to subscribe to receive warning delivery related notifications. The CBCF function may also be realized by merging PWSF function specified above into an existing CBC function.

FIG. 15 is a block diagram of a protocol stack for a control plane for the networked system shown in FIGS. 13, 14A, and 14B configured in accordance with an example embodiment of the present disclosure. The NG Application Protocol information for Cell Broadcast (NG-AP-CB 1502) is a subset of NG-AP information that the AMF 1303 relays between the NG-RAN 1502 and the CBCF 1354.

The NG Application Protocol (NGAP 1504) is an application layer protocol between the NG-RAN 104 entity (e.g., eNodeB and/or gNodeB) and the AMF 1303. The SCTP for the control plane (SCTP 1506) is configured to deliver signaling messages between AMF 1303 and NG-RAN 104 (N2) and between the CBCF 1354 and AMF 1303 (NBc). As shown, the CBCF function can be realized by merging the PWSF function as described above into an existing CBC function.

The CBCF network function 1354 uses Namf_Communication service to communicate with the NG-RAN 104 for sending warning request primitives and receiving warning message delivery indication or restart/failure indication primitives. The requirements are described by primitives. The following table shows primitives that may be supported using AMF 1303 via Namf interface in accordance with one embodiment.

CBCF Interface Primitives

| Name | Originator | Type | Namf Service operations |
|---|---|---|---|
| WRITE-REPLACE-WARNING-REQUEST | CBCF | Request/Indication | Namf_Communication_N1N2MessageTransfer Namf_Communication_N2InfoSubscribe |
| WRITE-REPLACE-WARNING-CONFIRM | AMF | Response/Confirm | Namf_Communication_N2InfoSubscribe Namf_Communication_N2InfoNotify |
| STOP-WARNING-REQUEST | CBCF | Request/Indication | Namf_Communication_N1N2MessageTransfer Namf_Communication_N2InfoSubscribe |
| STOP-WARNING-CONFIRM | AMF | Response/Confirm | Namf_Communication_N2InfoSubscribe Namf_Communication_N2InfoNotify |
| WRITE-REPLACE-WARNING-INDICATION | AMF | Request/Indication | Namf_Communication_N2InfoSubscribe Namf_Communication_N2InfoNotify |
| STOP-WARNING-INDICATION | AMF | Request/Indication | Namf_Communication_N2InfoSubscribe Namf_Communication_N2InfoNotify |
| NG-RAN_RESTART-INDICATION | AMF | Request/Indication | Namf_Communication_N2InfoSubscribe Namf_Communication_N2InfoNotify |
| NG-RAN_FAILURE-INDICATION | AMF | Request/Indication | Namf_Communication_N2InfoSubscribe Namf_Communication_N2InfoNotify |

FIG. 16 is an additional networked system in accordance with an example embodiment of the present disclosure. In this architecture alternative, the AMF 1602 interfaces with CBC 1604 and NG-RAN 104 to enable PWS service by using an SBc-like protocol interface (NBc 1603) interface between AMF and CBC. In some examples, the same protocol stack and procedures for SBc interface will be re-used for NBc interface.

The AMF 1602 may be configured to interface to one CBC 1604 or multiple CBCs (e.g., the AMF is allowed to have SCTP transport associations established with one or multiple CBCs). The AMF 1602 may also be configured to interface to several NG-RANs 104 (e.g., combinations of gNodeBs and/or eNodeBs).

Furthermore, the AMF 1602 is configured to route a WRITE-REPLACE-WARNING-REQUEST message to the appropriate NG-RAN 104 entities upon receiving warning message request from the CBC 1604. The AMF 1602 is also configured to route the STOP-WARNING-REQUEST message to the appropriate NG-RAN 104 entities upon receiving a STOP-WARNING-REQUEST message from the CBC 1604 and deliver warning message success or failure notifications.

The AMF 1602 is also configured to provide acknowledgement of successful execution of commands received from the CBC 1604 to the CBC 1604 and report a failure when a command received from the CBC 1604 is not understood or cannot be executed by the CBC 1604.

Furthermore, the AMF 1602 is configured to report a Broadcast completed area list and a Broadcast cancelled area list to the CBC; and forward a PWS RESTART-INDICATION and a PWS FAILURE-INDICATION received from NG-RAN 104 entities to all CBCs 1604 with which the AMF interfaces.

As shown in FIG. 16, the CBC 1604 is integrated as a node in the 5G core network. The CBC 1604 may be connected to several AMFs 1602. The CBC 1604 may also be connected to several CBEs 112. The CBC 1604 is configured to manage CBS messages. The CBC 1604 may also reuse existing SBc protocol interfaces for warning message delivery between AMF 160 and CBC 1604.

FIG. 17 is a block diagram of a protocol stack for a control plane for the networked system shown in FIG. 16 configured in accordance with an example embodiment of the present disclosure. NBc Application Protocol (NBc-AP 1702) is an Application Layer Protocol between the CBC 1604 and the AMF 1602. This protocol supports transfer of warning messages.

The NG Application Protocol (NGAP 1704) is an Application Layer Protocol between the NG-RAN 104 entity (eNodeB and/or gNodeB) and the AMF 1602.

The SCTP for the control plane (SCTP 1706) is a protocol which guarantees delivery of signaling messages between the AMF 1602 and NG-RAN 104 (N2) and between the CBC 1604 and the AMF 1602 (NBc).

As described above, the CBC network function uses a Namf_Communication service to communicate with the NG-RAN for sending warning request primitives and receiving warning message delivery indication or restart/failure indication primitives.

The following table shows primitives that may be implemented to support using the AMF via a Namf interface in accordance with one example embodiment.

AMF Via NAMF Primitives

| Name | Originator | Type |
| --- | --- | --- |
| WRITE-REPLACE-WARNING-REQUEST | CBC | Request/Indication |
| WRITE-REPLACE-WARNING-CONFIRM | AMF | Response/Confirm |
| STOP-WARNING-REQUEST | CBC | Request/Indication |
| STOP-WARNING-CONFIRM | AMF | Response/Confirm |
| WRITE-REPLACE-WARNING-INDICATION | AMF | Request/Indication |
| STOP-WARNING-INDICATION | AMF | Request/Indication |
| RESTART-INDICATION-NG-RAN | AMF | Request/Indication |
| FAILURE-INDICATION-NG-RAN | AMF | Request/Indication |

Referring now to FIG. 18, the operations performed, such as by the PWSF 108 embodied on a core network 202 of FIG. 2 which may be embodied by or in association with processing circuitry 500, are illustrated in order to provide a warning message via a public warning system. As shown in block 1802 of FIG. 18, the apparatus of this example embodiment includes means, such as the processing circuitry 500, the processor 502 or the like, for generating a public warning system function start up request and transmitting the request to a network registry, such as shown steps 703 and 704 in FIG. 7.

As shown in block 1804 of FIG. 18, the apparatus of this example embodiment includes means, such as the processing circuitry 500, the processor 502 or the like, for receiving a subscription request from an access and management function (AMF) service comprising a warning area list, such as shown operation 708 in FIG. 7.

As shown in block 1806 of FIG. 18, the apparatus of this example embodiment includes means, such as the processing circuitry 500, the processor 502 or the like, for subscribing to network notifications from a radio access network via the AMF service, such as shown in operations 709 and 712 in FIG. 7.

As shown in block 1808 of FIG. 18, the apparatus of this example embodiment includes means, such as the processing circuitry 500, the processor 502 or the like, for receiving a warning message comprising an active warning area list, such as shown in operation 904 in FIG. 9. In some examples, receiving the warning message also includes transmitting an acknowledge to the entity (such as CBC 110) which sent the warning message to the PWSF, such as shown at operation 905 in FIG. 9.

As shown in block 1810 of FIG. 18, the apparatus of this example embodiment includes means, such as the processing circuitry 500, the processor 502 or the like, for transforming the warning message for transmission to a radio access network.

As shown in block 1812 of FIG. 18, the apparatus of this example embodiment includes means, such as the processing circuitry 500, the processor 502 or the like, for transmitting the transformed warning message to the radio access network via the AMF service such as shown in operation 907 of FIG. 9. In some examples, the apparatus may then wait for warning response from the radio access network via the AMF service and transmit a warning response once received, as shown in operations 912 and 913 in FIG. 9.

In some examples, the operations described in FIG. 18 may be performed by a PWSF such the PWSF 108. In another example embodiment, the operations in FIG. 18 may be performed by a CBCF, such as CBCF 1354 shown in FIG. 13 or by a CBC such as the CBC 1604 shown in FIG. 16.

As described above, FIG. 18 illustrates a flowchart of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 504 of an apparatus employing an embodiment of the present invention and executed by processing circuitry 500, e.g., a processor 502, of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus configured to perform a public warning system (PWS) function, the apparatus comprising at least one processor and at least one memory including computer program code for one or more programs, the at least one memory and the computer program code configured to, with the at least one processor, cause the apparatus at least to:

receive, via first interface implemented by a SBc-like point to point interface, utilizing a protocol stack that supports an application layer protocol for transferring warning messages and a stream control transmission protocol for delivering signaling messages, a warning message, wherein the warning message is provided by a cell broadcast entity;

transform the warning message at least by interpreting a warning message request provided by the cell broadcast entity and generating a WRITE-REPLACE-WARNING-REQUEST message to be transmitted to an access and mobility management function (AMF); and cause the warning message, as transformed, to be transmitted via a second interface, different than the first interface, to the AMF for transmission to a radio access network.

2. An apparatus according to claim 1 wherein the second interface comprises a service based interface.

3. An apparatus according to claim 1 wherein the warning message that is received identifies a warning area, and wherein the apparatus is caused to cause the warning message, as transformed, to be transmitted to one or more radio access networks which broadcast over the warning area.

4. An apparatus according to claim 1 wherein the apparatus is further caused to receive a cancellation indication from the AMF including a broadcast cancelled area list and to cause information regarding the cancellation indication to be transmitted to the cell broadcast entity.

5. An apparatus according to claim 1 wherein the apparatus is further caused to receive a warning delivery related notification from the AMF and to cause information regarding the warning delivery related notification to be transmitted to the cell broadcast entity, wherein the warning delivery notification comprises an indication related to a failure or a restart.

6. A method for performing a public warning system (PWS) function, the method comprising:

receiving, via a first interface that is implemented by an SBc-like point to point interface, utilizing a protocol stack that supports an application layer protocol for transferring warning messages and a stream control transmission protocol for delivering signaling messages, a warning message, wherein the warning message is provided by a cell broadcast entity;

transforming the warning message at least by interpreting a warning message request provided by the cell broadcast entity and generating a WRITE-REPLACE-WARNING-REQUEST message to be transmitted to an access and mobility management function (AMF); and causing the warning message, as transformed, to be transmitted via a second interface, different than the first interface, to the AMF for transmission to a radio access network.

7. A method according to claim 6 wherein the second interface comprises a service based interface.

8. A method according to claim 6 wherein the warning message that is received identifies a warning area, and wherein the method comprises causing the warning message, as transformed, to be transmitted by causing the warning message, as transformed, to be transmitted to one or more radio access networks which broadcast over the warning area.

9. A method according to claim 6 further comprising receiving a cancellation indication from the AMF including a broadcast cancelled area list and causing information regarding the cancellation indication to be transmitted to the cell broadcast entity.

10. A method according to claim 6 further comprising receiving a warning delivery related notification from the AMF and causing information regarding the warning delivery related notification to be transmitted to the cell broadcast entity, wherein the warning delivery notification comprises an indication related to a failure or a restart.

11. A method according to claim 6 further comprising broadcasting information based upon the warning message, as transformed, via the radio access network to one or more user equipment.

12. An apparatus configured to perform a public warning system (PWS) function, the apparatus comprising at least one processor and at least one memory including computer program code for one or more programs, the at least one memory and the computer program code configured to, with the at least one processor, cause the apparatus at least to:

receive, utilizing a protocol stack that supports an application layer protocol for transferring warning messages and a stream control transmission protocol for delivering signaling messages, an emergency broadcast request warning message provided by a cell broadcast entity;

in response to receiving said emergency broadcast request warning message, generate, based upon the emergency broadcast request warning message, a warning request operable to cause nodes of a radio access network to broadcast an emergency warning over the radio access network; and cause the warning request to be transmitted to the radio access network via an access and mobility management function (AMF).

13. An apparatus according to claim 12 wherein the apparatus is further caused to receive a response from the radio access network via the AMF indicating that the emergency warning has been broadcast and, in response to the response received from the radio access network, generate an indication of completion of the emergency warning and provide said indication of completion of the emergency warning to be provided to the cell broadcast entity.

14. An apparatus according to claim 12 wherein the apparatus is further caused to receive a stop emergency broadcast request warning message provided by the cell broadcast entity and, in response to the stop emergency broadcast request warning message, cause a request to stop the warning request to be transmitted to the radio access network via the AMF.

15. An apparatus according to claim 14 wherein the apparatus is further caused to receive a response from the radio access network via the AMF indicating that the warning request has been stopped and, in response to the response, cause an indication of stopping of the warning request to be provided to the cell broadcast entity.

16. A method for performing a public warning system (PWS) function, the method comprising:

receiving, utilizing a protocol stack that supports an application layer protocol for transferring warning messages and a stream control transmission protocol for delivering signaling messages, an emergency broadcast request warning message provided by a cell broadcast entity;

in response to receiving said emergency broadcast request warning message, generating, based upon the emergency broadcast request warning message, a warning request operable to cause nodes of a radio access network to broadcast an emergency warning over the radio access network; and causing the warning request to be transmitted to the radio access network via an access and mobility management function (AMF).

17. A method according to claim 16 further comprising receiving a response from the radio access network via the AMF indicating that the emergency warning has been broadcast and, in response to the response received from the radio access network, generating an indication of completion of the emergency warning and providing said indication of completion of the emergency warning to the cell broadcast entity.

18. A method according to claim 16 further comprising receiving a stop emergency broadcast request warning message provided by the cell broadcast entity and, in response to the stop emergency broadcast request warning message, causing a request to stop the warning request to be transmitted to the radio access network via the AMF.

19. A method according to claim 18 further comprising receiving a response from the radio access network via the AMF indicating that the warning request has been stopped and, in response to the response, causing an indication of stopping of the warning request to be provided to the cell broadcast entity.

* * * * *

UNITED STATES PATENT AND TRADEMARK OFFICE
CERTIFICATE OF CORRECTION

PATENT NO. : 10,911,924 B2  
APPLICATION NO. : 16/151599  
DATED : February 2, 2021  
INVENTOR(S) : Liu Page 1 of 1

It is certified that error appears in the above-identified patent and that said Letters Patent is hereby corrected as shown below:

In the Claims

Column 23,
Line 8, Claim 1 "via first interface" should read --via a first interface--.

Column 24,
Line 49, Claim 13 "warning to be provided to the cell broadcast entity" should read --warning to the cell broadcast entity--.

Signed and Sealed this
Twenty-eighth Day of June, 2022

Katherine Kelly Vidal
*Director of the United States Patent and Trademark Office*